(12) United States Patent
Inoue et al.

(10) Patent No.: US 7,446,829 B2
(45) Date of Patent: Nov. 4, 2008

(54) BACKLIGHT UNIT AND LIQUID CRYSTAL DISPLAY UNIT USING BACKLIGHT UNIT

(75) Inventors: Yutaka Inoue, Suzuka (JP); Kohji Ohtsuka, Tochigi (JP); Kazuya Idei, Kuki (JP); Masaki Shimizu, Yaita (JP); Takashi Yoshii, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 144 days.

(21) Appl. No.: 10/529,545

(22) PCT Filed: Sep. 26, 2003

(86) PCT No.: PCT/JP03/12387

§ 371 (c)(1),
(2), (4) Date: Mar. 29, 2005

(87) PCT Pub. No.: WO2004/031647

PCT Pub. Date: Apr. 15, 2004

(65) Prior Publication Data

US 2006/0044830 A1 Mar. 2, 2006

(30) Foreign Application Priority Data

Sep. 30, 2002 (JP) .............................. 2002-287111
Oct. 11, 2002 (JP) .............................. 2002-298943
May 15, 2003 (JP) .............................. 2003-136778

(51) Int. Cl.
*F21V 7/22* (2006.01)

(52) U.S. Cl. ...................... 349/67; 362/297; 362/346; 362/561; 359/883

(58) Field of Classification Search .................. 362/97, 362/296, 297, 327, 339, 341, 346, 561, 614, 362/623, 633; 349/67, 70, 113; 359/883
See application file for complete search history.

(56) References Cited

U.S. PATENT DOCUMENTS 4,673,254 A 6/1987 Kato et al.

(Continued)

FOREIGN PATENT DOCUMENTS

JP 02-107123 8/1990

(Continued)

*Primary Examiner*—Jong-Suk (James) Lee
*Assistant Examiner*—Leah S Lovell
(74) *Attorney, Agent, or Firm*—Birch, Stewart, Kolasch & Birch, LLP

(57) ABSTRACT

To compensate for uneven brightness in the longitudinal direction of fluorescent lamps of a backlight unit and achieve a display screen with an even brightness, a reflection unit of the backlight unit, the fluorescent tube surface of the fluorescent lamps or a diffusion unit is used to either reduce the reflectance, transmittance, or radiation brightness of the high-voltage side of the fluorescent lamps or increase the reflectance, transmittance, or radiation brightness of the low-voltage side thereof so as to compensate for uneven brightness of the illumination light and thereby ensure an even brightness. For example, dot pattern regions $D_1$, $D_2$ and $D_3$, i.e., the regions whose density increases in stages, are imparted to the portion of a reflection layer 13 of the backlight unit with a relatively high brightness. As for the display device, on the other hand, the display image data supplied to a liquid crystal panel or the aperture ratio of the liquid crystal panel is controlled, for example, to compensate for uneven brightness in the longitudinal direction of the fluorescent lamps and ensure an even brightness.

1 Claim, 13 Drawing Sheets

U.S. PATENT DOCUMENTS

| | | | |
|---|---|---|---|
| 5,134,549 A * | 7/1992 | Yokoyama | 362/623 |
| 5,178,447 A * | 1/1993 | Murase et al. | 362/621 |
| 5,450,292 A * | 9/1995 | Yokoyama et al. | 362/613 |
| 5,583,669 A * | 12/1996 | Fushimi et al. | 349/5 |
| 5,649,754 A * | 7/1997 | Matsumoto | 362/618 |
| 5,667,289 A * | 9/1997 | Akahane et al. | 362/614 |
| 5,775,791 A * | 7/1998 | Yoshikawa et al. | 362/625 |
| 5,886,759 A * | 3/1999 | Mashino et al. | 349/65 |
| 5,961,198 A * | 10/1999 | Hira et al. | 362/621 |
| 5,975,722 A | 11/1999 | Van Duijneveldt | |
| 6,133,894 A * | 10/2000 | Yagyu | 345/89 |
| 6,219,117 B1 * | 4/2001 | Nagakubo et al. | 349/65 |
| 6,402,335 B1 * | 6/2002 | Kalantar et al. | 362/619 |
| 6,447,136 B1 * | 9/2002 | Liu et al. | 362/625 |
| 6,454,452 B1 * | 9/2002 | Sasagawa et al. | 362/561 |
| 6,533,440 B2 * | 3/2003 | Koyama et al. | 362/296 |
| 6,611,304 B2 * | 8/2003 | Itoh et al. | 349/65 |
| 6,943,857 B2 * | 9/2005 | Tsubokura et al. | 349/112 |
| 7,088,333 B1 * | 8/2006 | Manabe et al. | 345/102 |

FOREIGN PATENT DOCUMENTS

| | | |
|---|---|---|
| JP | 7-272506 A | 10/1995 |
| JP | 8-335048 A | 12/1996 |
| JP | 10-082914 | 3/1998 |
| JP | 10-112213 A | 4/1998 |
| JP | 11119217 | 4/1999 |
| JP | 11-295731 A | 10/1999 |
| JP | 2000-047169 A | 2/2000 |
| JP | 2001006412 | 1/2001 |
| JP | 2002-040453 | 2/2002 |
| JP | 2002-055675 | 2/2002 |
| JP | 2002093230 | 3/2002 |
| JP | 2002-116705 | 4/2002 |

* cited by examiner

FIG. 8
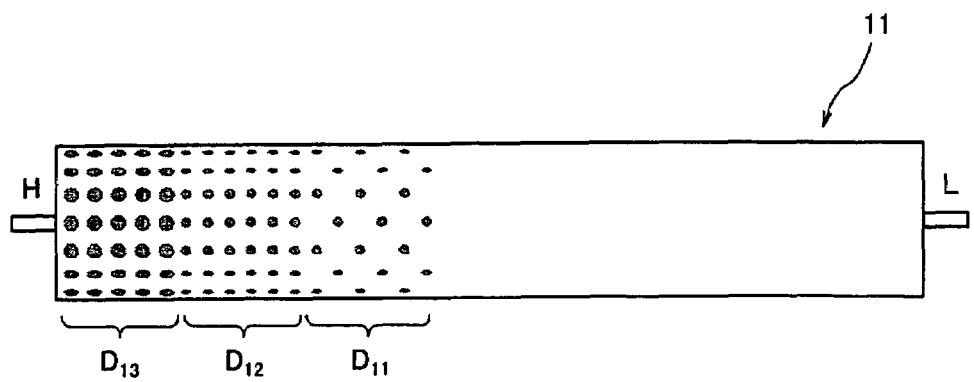
FIG. 9A
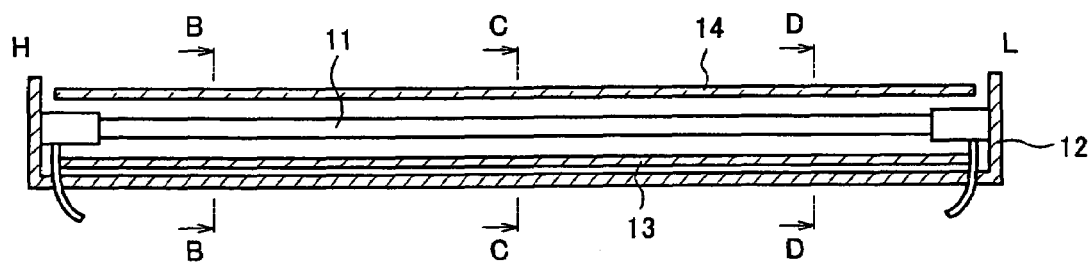
FIG. 9B   FIG. 9C   FIG. 9D
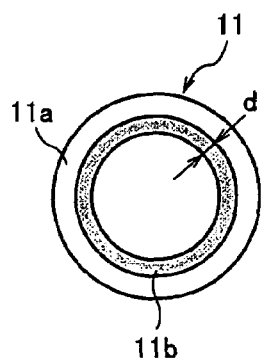 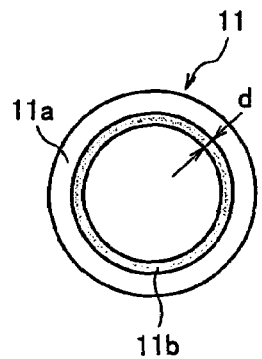 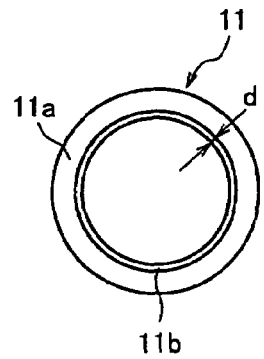

BACKLIGHT UNIT AND LIQUID CRYSTAL DISPLAY UNIT USING BACKLIGHT UNIT

TECHNICAL FIELD

The present invention relates to a backlight unit operable to illuminate a target from the rear side and a liquid crystal display device using the backlight unit.

BACKGROUND OF THE INVENTION

A backlight unit is used to illuminate the target such as an LCD display panel. An LCD display device employs either one of two types of backlight configurations as a backlight unit; the direct type and the edge light type (light guide plate type).

With the direct type, fluorescent tubes, i.e., a light source, are arranged directly below the liquid crystal panel to be illuminated. This allows fluorescent tubes to be increased with the change in the display screen size, thus achieving a sufficient brightness. In this case, however, the backlight unit is prone to an uneven brightness between areas having a fluorescent lamp and others not. Moreover, the direct type backlight unit must be built with sufficient strength. For example, the backlight case is fabricated with a metal plate. Then, a reflective sheet is affixed to the inner surface of the backlight, with a plurality of straight tube lamps arranged thereabove.

With the edge light type, on the other hand, a fluorescent lamp is arranged at the edge of a light guiding body made, for example, of a clear acrylic plate. This type of backlight unit takes advantage of multireflection in the light guiding body to use one surface thereof as an area light source. The edge light type has a reflector at the back of the straight tube lamp and L-shaped lamp. Although the display device using the edge light type backlight unit can be reduced in thickness, the light guiding body of the large-size model becomes excessively heavy. Besides, upsizing of the device makes it difficult to secure sufficient screen brightness.

The aforementioned features are the reasons why, in general, the direct type backlight unit is used for a large-screen liquid crystal display device, whereas the edge light type backlight unit is used for those with a small screen.

The fluorescent lamps used for the backlight unit as described above are driven by a high voltage of 1 KV at a high frequency of 50 to 70 KHz to achieve even and high brightness. At this time, the fluorescent lamps develop uneven brightness, i.e., uneven brightness, in the form of a brightness gradient between the high- and low-voltage sides as a result of a leak current. This problem is caused by the following reason. The fluorescent lamps are driven by a high voltage at a high frequency. This causes the air layer to act as a stray capacitance and leads to a leak current flowing from the fluorescent lamps to the lamp reflector and the surrounding metal objects. As a result, the current flowing into the low-voltage side of the fluorescent lamps diminishes. This causes the low-voltage side to illuminate relatively less brighter than the high-voltage side.

Therefore, if the fluorescent lamps are long, the leak current rises proportionally to the length thereof. In the presence of a large leak current, the farther the fluorescent lamps are from the drive circuit, the darker they become. This constitutes the cause of uneven brightness. That is, the larger the liquid crystal display device, the more likely the difference in brightness occurs between the high- and low-voltage sides of the lamps. It can be said that the technique allowing the realization of a backlight unit with minimal uneven brightness is essential.

FIG. 18 is an explanatory view of the brightness characteristic of fluorescent lamps, illustrating an example of the brightness distribution in the longitudinal direction (i.e., in the direction of voltage application) of the fluorescent lamps generally used for a backlight type liquid crystal display device.

As shown in FIG. 18, the fluorescent lamps have a brightness gradient whose relative brightness diminishes from a high-voltage side H to a low-voltage side L. The brightness drop is particularly noticeable near the edge of the low-voltage side L. The brightness distribution curve itself also varies depending on the shape of the fluorescent lamps, the length of the fluorescent tube, the drive voltage or the drive frequency. Basically, however, the fluorescent lamps develop uneven brightness in the form of relatively low brightness at the low-voltage side L as compared with the high-voltage side H.

FIG. 19 is a graph showing the brightness distribution characteristic in the longitudinal direction (in the direction of voltage application) of the fluorescent lamps having the brightness gradient shown in FIG. 18 when the drive voltage is further raised. In the example of FIG. 19, the brightness of the fluorescent lamps at the center and low-voltage side L is roughly equal. However, the brightness is relatively higher near the edge at the high voltage side H. For example, assuming that the brightness is 100 at the center and the low-voltage side, the brightness is relatively higher or 115 to 125 at the high-voltage side H. The brightness, highest at the edge of the high-voltage side H, gradually declines toward the center of the fluorescent lamps.

The display screen also develops uneven brightness due to uneven brightness developed by the fluorescent lamps in the longitudinal direction as described above. As a technique to reduce such uneven brightness in the display screen, the liquid crystal display device using a backlight is known as shown below.

FIGS. 20A and 20B are explanatory views of an example of the liquid crystal display device having a conventional direct type backlight unit. FIG. 20A illustrates a side cross-sectional schematic configuration of the LCD device, whereas FIG. 20B illustrates a plan schematic configuration of the fluorescent lamps, i.e., the light source of the backlight unit.

As shown in FIGS. 20A and 20B, the backlight unit has a plurality of fluorescent lamps 101, reflectors 102 adapted to reflect the light from the fluorescent lamps 101 and an optical diffusion unit 103 provided at the front of the fluorescent lamps 101 and adapted to diffuse the light directly incident from the fluorescent lamps 101 or that reflected by the reflectors 102. The backlight unit is used to illuminate a liquid crystal panel 104 provided at the front (surface side) thereof through the optical diffusion unit 103.

With the aforementioned backlight unit, the fluorescent lamps 101 are arranged in sets of two such that the high-voltage side of one lamp is adjacent to the low-voltage side of the other to compensate for uneven brightness in the lamps 101 and achieve a display screen with even brightness.

That is, as shown in FIGS. 20A and 20B, the backlight unit is provided with a plurality of sets ($S_1$, $S_2$, $S_3$ and beyond) of the two fluorescent lamps 101, with the high-voltage side H of one lamp adjacent to the low-voltage side L of the other lamp. Such a configuration cancels out uneven brightness resulting from each fluorescent lamp, thus eliminating uneven brightness on the display screen and achieving an even display.

A liquid crystal display device in Patent Document 1 is disclosed as an example with the high- and low-voltage sides H and L arranged adjacent to each other.

Further, the technique as shown in FIGS. 21A and 21B is available that is associated with the liquid crystal display device operable to improve the reflectance of the light from the backlight. FIGS. 21A and 21B illustrate another example of the backlight unit in a conventional liquid crystal display device. FIG. 21A illustrates a side cross-sectional schematic configuration of the backlight unit, whereas FIG. 21B illustrates a plan schematic configuration of the inside of the unit, with the optical diffusion sheet, provided on the backlight unit surface, removed. In FIGS. 21A and 21B, reference numeral 201 denotes linear fluorescent lamps, 202 optical diffusion sheets, 203 a reflection sheet and 204 a reflection layer and 205 an enclosure.

The backlight unit shown in FIGS. 21A and 21B has the reflection layer 204, made of a high reflectance material such as aluminum, on the inner surface at the bottom of the enclosure 205 further at the back of the reflection sheet 203 provided at the back of the linear fluorescent lamps 201 to efficiently enhance the brightness. Here, of the light incident on the reflection sheet 203, the fraction that passes through the sheet 203 without being reflected is reflected again by the reflection layer 204 back toward the reflection sheet 203, rather than disappears or becomes diffused at the back of the reflection sheet 203. This ensures efficient use of the light passing through the sheet 203 from the back, thus enhancing the brightness.

In general, a foamed PET (Poly Ethylene Terephthalate) sheet is often used for the direct type reflection unit (equivalent to the reflection sheet 203 described above). The foamed PET reflection sheet is manufactured by foaming PET to produce fine air bubbles within the sheet. The light incident on the foamed PET sheet is refracted by the air bubbles to regress and emerge again from the incident side. Such a light reflection takes advantage of the refraction characteristic between the PET material and the air in the air bubbles, thus minimizing light loss and achieving a high reflectance reflection unit, despite the use of an inexpensive member. In addition to the above, other materials may be alternatively used including those coated on the surface with a high reflectance material such as silver or aluminum.

For example, while the reflection sheet 203, formed with a foamed PET sheet as described above, achieves a high reflectance, part of the incident light from the light source passes through the foamed PET sheet to the rear side (back side opposite to the light source). This leads to reduced light utilization efficiency. To improve these points for enhanced light utilization efficiency, the reflection layer 204 made of a high reflectance material such as aluminum is provided on the inner surface of the enclosure 205 at the back of the reflection sheet 203 to reflect the light passing through the reflection sheet 203 with the reflection layer 204. Part of the reflected light from the reflection layer 204 passes again through the reflection sheet 203 and emerges on the front side (light source side). This ensures improved light utilization efficiency.

An edge light type backlight device using a light guide plate is disclosed, for example, in Patent Document 2 as the backlight device having another reflection layer stacked at the back of the reflection sheet as described above.

Further, Patent Document 3 discloses a technique that changes the leak current flowing between the high- and low-voltage sides of the fluorescent tube in an edge light type backlight unit to suppress the uneven brightness of the screen.

With this backlight unit, the fluorescent lamp is shaped to have straight tube portions in one piece; the one portion running along one of the longer sides of the light guide plate and the other portions each running along one of the shorter sides of the plate. The reflector, provided on the straight tube portion at the high-voltage side of the fluorescent lamp, i.e., one of the tube portions running along the shorter sides of the light guide plate, is formed with a white reflecting member, whereas the reflector at the low-voltage side is deposited on the inside with silver. Such a configuration changes the leak current flowing between the high- and low-voltage sides, thus securing a proper fluorescent lamp length to generate necessary brightness over the rectangular screen and minimizing the difference in brightness between the left and right sides of the screen.

Further, the problem here derives from the driving at a high frequency. Therefore, the method is under consideration to drive the fluorescent lamp at the lowest possible frequency for increased the impedance of the stray capacitance and reduced leak current, thus eliminating uneven brightness.

Description will be given next of the problems associated with the conventional techniques described above.

With the liquid crystal display device described in Patent Document 1, the fluorescent lamps are arranged parallel with each other in sets of two such that the high-voltage side H of one lamp is adjacent to the low-voltage side L of the other. At this time, because of the proximity between the high-voltage side terminal of one fluorescent lamp and the low-voltage side terminal of the other lamp adjacent thereto, discharge may occur between the two electrodes. This renders the stable discharge of the fluorescent lamps itself extremely difficult and possibly deteriorates the reliability of the device.

Moreover, the high- and low-voltage terminals of the fluorescent lamps are disposed separately on both sides of the display screen. This requires two inverter power circuits, resulting in higher cost. Further, the thinner and larger the display device, the more difficult it is to make wiring connections to the fluorescent lamps. As a result, additional measures are required to ensure wiring safety and prevent the current leak.

With the backlight device of Patent Document 2, on the other hand, if the brightness distribution of the fluorescent lamp is not uniform in the longitudinal direction, the entire display screen may develop uneven brightness as a result of the uneven brightness of the fluorescent lamp. This makes it difficult to control the brightness distribution. In particular, the GND side (low-voltage side) is prone to current leak from the fluorescent lamp. This results in high brightness only at the high-voltage side of the fluorescent lamp and low brightness at the GND side.

In the case of Patent Document 3, provision of the white reflector only on one of the shorter sides of the fluorescent lamp alone cannot compensate for the brightness gradient inherently present in the fluorescent lamps. The fluorescent lamp invariably develops a brightness gradient at least along its longer sides. This results in uneven brightness in the liquid crystal display device. If the fluorescent lamp is longer as a result of the upsizing of the liquid crystal display device, the aforementioned problem becomes more noticeable.

Further, while the method of lighting the lamps at a lower drive frequency could be possible to the extent that thermal runaway does not occur in the transformer, an excessively low frequency design could degrade the reliability. Besides, lowering the drive frequency will result in larger components such as the transformer.

In light of the foregoing, the present invention was conceived and the object thereof is to provide a backlight unit operable to compensate for the brightness difference between the high- and low-voltage sides of the fluorescent lamps, provided as a light source, and to ensure an even brightness of the outgoing light, and a liquid crystal display device operable to ensure an even brightness over the entire display screen.

Patent Document 1: Japanese Laid-Open Patent Publication No. H11-295731

Patent Document 2: Japanese Laid-Open Patent Publication No. H08-335048

Patent Document 3: Japanese Laid-Open Patent Publication No. H10-112213

DISCLOSURE OF THE INVENTION

The first technical measure of the present invention is characterized by a backlight unit operable to illuminate the target with fluorescent lamps, the backlight unit comprising brightness compensation means adapted to compensate for uneven brightness in the longitudinal direction of the fluorescent lamps.

The second technical measure of the present compensate for uneven brightness in the longitudinal direction of the fluorescent lamps.

The third technical measure of the present invention is characterized by the backlight unit of the second technical measure, wherein the brightness compensation means have regions with relatively high and low reflectances in the reflection unit and take advantage of the difference in reflectance to compensate for uneven brightness in the longitudinal direction of the fluorescent lamps.

The fourth technical measure of the present invention is characterized by the backlight unit of the third technical measure, wherein the brightness compensation means have a reflectance gradient that causes the reflectance of the reflection unit to decline gradually or in stages and take advantage of the reflectance gradient to reduce the brightness of the portion with a relatively high brightness in the longitudinal direction of the fluorescent lamps.

The fifth technical measure of the present invention is characterized by the backlight unit of the third or fourth technical measure, wherein the brightness compensation means have a reflectance gradient that causes the reflectance of the reflection unit to increase gradually or in stages and take advantage of the reflectance gradient to increase the brightness of the portion with a relatively low brightness in the longitudinal direction of the fluorescent lamps.

The sixth technical measure of the present invention is characterized by the backlight unit of any one of the second to fifth technical measures, wherein the brightness compensation means are a dot pattern provided on the reflection unit and take advantage of the dot pattern to control the reflectance of the reflection unit.

The seventh technical measure of the present invention is characterized by the backlight unit of the sixth technical measure, wherein the reflectance of the reflection unit provided with the dot pattern is controlled by one or a plurality of the reflectance of the group of small dots making up the dot pattern, the dot density, the dot shape, and the dot color.

The eighth technical measure of the present invention is characterized by the backlight unit of the first technical measure, comprising a reflection unit adapted to emit the light from the fluorescent lamps in a specific direction, wherein the reflection unit is made up of first and second reflection layers having given optical reflectance and transmittance, wherein the reflection unit is configured with a first region having the first and second reflection layers stacked one above another in the direction of incidence of light and a second region made up only of the first reflection layer, and wherein the reflectance of the reflection unit is controlled using the first region with a relatively high reflectance and the second region with a reflectance lower than that of the first region.

The ninth technical measure of the present invention is characterized by the backlight unit of the first technical measure, wherein the brightness, compensation means are provided on a glass tube of the fluorescent lamps and control the transmittance of the glass tube to compensate for uneven brightness in the longitudinal direction of the fluorescent lamps.

The tenth technical measure of the present invention is characterized by the backlight unit of the first technical measure, comprising a diffusion unit adapted to diffuse the light from the fluorescent lamps, wherein the brightness compensation means are provided on the diffusion unit and control the transmittance of the diffusion unit to compensate for uneven brightness in the longitudinal direction of the fluorescent lamps.

The eleventh technical measure of the present invention is characterized by the backlight unit of the ninth or tenth technical measure, wherein the brightness compensation means have regions with relatively high and low transmittances in the glass tube or diffusion unit and take advantage of the difference in the transmittance to compensate for uneven brightness in the longitudinal direction of the fluorescent lamps.

The twelfth technical measure of the present invention is characterized by the backlight unit of the eleventh technical measure, wherein the brightness compensation means have a transmittance gradient that causes the transmittance to decline gradually or in stages and take advantage of the transmittance gradient to reduce the brightness of the portion with a relatively high brightness in the longitudinal direction of the fluorescent lamps.

The thirteenth technical measure of the present invention is characterized by the backlight unit of the eleventh or twelfth technical measure, wherein the brightness compensation means have a transmittance gradient that causes the transmittance to increase gradually or in stages and take advantage of the transmittance gradient to increase the brightness of the portion with a relatively low brightness in the longitudinal direction of the fluorescent lamps.

The fourteenth technical measure of the present invention is characterized by the backlight unit of any one of the ninth to thirteenth technical measures, wherein the brightness compensation means are a dot pattern provided on the glass tube of the fluorescent lamps or the diffusion unit and take advantage of the dot pattern to control the transmittance.

The fifteenth technical measure of the present invention is characterized by the backlight unit of the fourteenth technical measure, wherein the transmittance of the glass tube or the diffusion unit provided with the dot pattern is controlled by one or a plurality of the reflectance of the group of small dots making up the dot pattern, the dot density, the dot shape, and the dot color.

The sixteenth technical measure of the present invention is characterized by the backlight unit of the first technical measure, wherein the brightness compensation means are provided on the glass tube of the fluorescent lamps and control the tube surface brightness of the glass tube to compensate for uneven brightness in the longitudinal direction of the fluorescent lamps.

The seventeenth technical measure of the present invention is characterized by the backlight unit of the sixteenth technical measure, wherein the thickness of the fluorescent substance formed inside the glass tube of the fluorescent lamps as the brightness compensation means is changed correspondingly with the longitudinal position of the fluorescent lamps to compensate for uneven brightness in the longitudinal direction of the fluorescent lamps.

The eighteenth technical measure of the present invention is characterized by a liquid crystal display device comprising the backlight unit of any one of the first to seventeenth technical measure and a liquid crystal panel illuminated by the backlight unit.

The nineteenth technical measure of the present invention is characterized by a liquid crystal display device operable to apply an illumination light from a backlight unit having fluorescent lamps to a liquid crystal panel to display images, the liquid crystal display device comprising brightness compensation means adapted to compensate for uneven brightness in the longitudinal direction of the fluorescent lamps.

The twentieth technical measure of the present invention is characterized by the liquid crystal display device of nineteenth technical measure, wherein the brightness compensation means have a gradation conversion unit operable to carry out a given gradation conversion process of input image data and a control portion operable to switch between gradation conversion characteristics of the gradation conversion unit based on a synchronizing signal of the input image data, and wherein the control portion switches from one gradation conversion characteristic to another in the gradation conversion unit based on the screen position to display the image data to compensate for uneven brightness in the longitudinal direction of the fluorescent lamps.

The twenty-first technical measure of the present invention is characterized by the liquid crystal display device of the nineteenth technical measure, wherein the liquid crystal panel is configured to have, as the brightness compensation means, an aperture ratio that changes correspondingly with the display screen position, and wherein the aperture ratio is changed to compensate for uneven brightness in the longitudinal direction of the fluorescent lamps.

BRIEF DESCRIPTION OF THE DRAWINGS

FIG. 8 is an explanatory view of still another embodiment of the backlight unit according to the present invention;

FIGS. 9A to 9D are explanatory views of still another embodiment of the backlight unit according to the present invention;

PREFERRED EMBODIMENT OF THE INVENTION

Figure 1A:
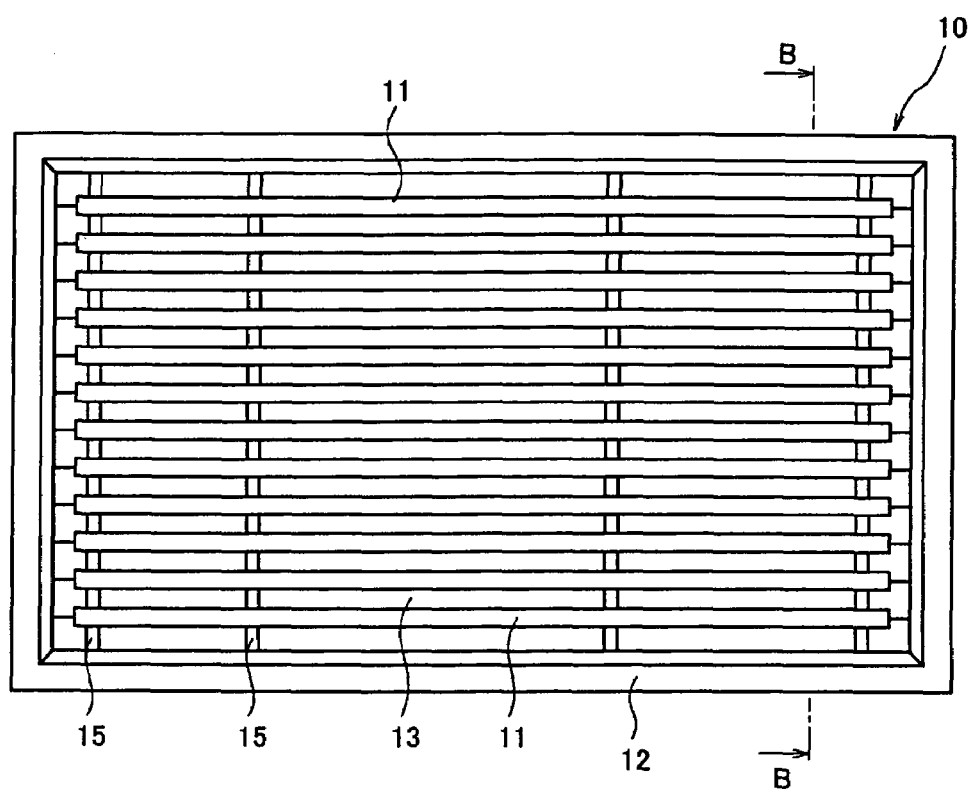
FIGS. 1A and 1B are explanatory views of an embodiment of a backlight unit according to the present invention.

As described above, the fluorescent lamps of the backlight unit develop a non-uniform brightness (uneven brightness) due to the relatively higher brightness at the high-voltage side. The present invention imparts, to the backlight unit or the liquid crystal display device, brightness compensation means operable to compensate for the uneven brightness in the longitudinal direction of the fluorescent lamps so as to compensate for the uneven brightness inherently present in the lamps and achieve a display screen with an even brightness.

To ensure an even brightness, the brightness compensation means imparted to the backlight unit provide:

(1) the reflection means intended to reflect the light of the fluorescent lamps and direct it in a single direction with means to reduce the reflectance of the high brightness portion of the fluorescent lamps (high-voltage side) or increase the reflectance of the low brightness portion of the fluorescent lamps (low-voltage side);

(2) the glass tube surface of the fluorescent lamps with means to reduce the transmittance of the high brightness portion of the fluorescent lamps (high-voltage side) or increase the transmittance of the low brightness portion of the fluorescent lamps (low-voltage side);

(3) the glass tube surface of the fluorescent lamps with means to reduce the radiation brightness of the high-voltage side of the fluorescent lamps or increase the radiation brightness of the low-voltage side of the fluorescent lamps; or (4) the diffusion sheet with means to reduce the transmittance of the high brightness portion of the fluorescent lamps (high-voltage side) or increase the transmittance of the low brightness portion of the fluorescent lamps (low-voltage side). The above means may be used in combination to ensure an even brightness.

To ensure an even brightness, on the other hand, the brightness compensation means imparted to the display device control:

(1) the image data supplied to the liquid crystal panel to compensate for the uneven brightness in the longitudinal direction of the fluorescent lamps; or
(2) the aperture ratio of the liquid crystal panel to compensate for the uneven brightness in the longitudinal direction of the fluorescent lamps.

Description will be given below of the embodiments of the present invention that can accomplish the aforementioned brightness compensation means. It is to be noted that the same reference numerals are used to denote the elements, components or portions with similar functions throughout the drawings for describing the embodiments, and duplicated description is omitted.

Embodiment 1

In the present embodiment, the reflection layer in the backlight unit is provided with the brightness compensation means adapted to compensate for the brightness in the longitudinal direction of the fluorescent lamps so as to compensate for the uneven brightness of such lamps and evenly illuminate the target such as the liquid crystal display device. The brightness compensation means in the present embodiment are designed to control the reflectance of the light from the fluorescent lamps.

Figure 1B:
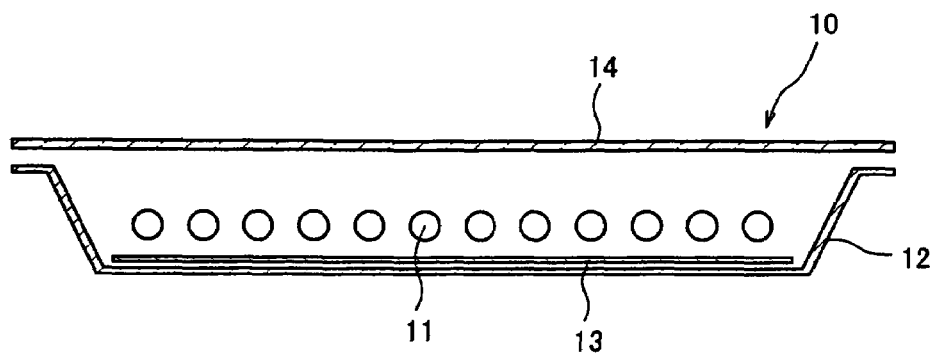

FIGS. 1A and 1B are explanatory views of an embodiment of the direct type backlight unit according to the present invention. FIG. 1A is a plan schematic view illustrating the inside of the backlight unit, whereas FIG. 1B is a schematic configuration diagram of the backlight unit taken along cross-section line B-B in FIG. 1A. In FIGS. 1A and 1B, reference numeral 10 denotes a backlight unit, 11 fluorescent lamps, 12 an enclosure, 13 a reflection layer provided at the bottom of the enclosure, 14 a diffusion unit and 15 lamp supporting members. It is to be noted that FIG. 1A illustrates the inside of the unit with the diffusion unit 14 shown in FIG. 1B removed.

The backlight unit 10 has a reflection unit adapted to emit the light from the fluorescent lamps 11 in a specific direction. In the present embodiment, the reflection layer 13 is provided as the reflection unit on the inner surface at the bottom of the enclosure 12 of the backlight unit 10. The enclosure 12 may be configured with a shielding plate adapted to shield electromagnetic waves generated from the fluorescent lamps 11.

The reflection layer 13 is held above the inner surface at the bottom of the enclosure 12 of the backlight unit 10 with a space therebetween or directly on the inner surface. A foamed PET sheet or a material with an optical reflection surface made of silver or aluminum may be used, for example, for this layer. As a foamed PET sheet, E60L or E60V type of Lumirror (R) from Toray may be preferably used.

The diffusion unit 14, provided at the front (surface) of the fluorescent lamps 11, is configured with a material having an optical diffusion characteristic such as acrylic plate to diffuse the incident light directly from the fluorescent lamps 11 or the light that is reflected by the reflection layer 13 and guided again back toward the front. In addition to the above, a functional film or sheet such as a reflective polarizing film, prism sheet or ITO sheet may be included between the diffusion unit 14 and the fluorescent lamps 11 for use in the liquid crystal display device.

The transmitted light passing through the diffusion unit 14 is used to illuminate the target (not shown) such as the liquid crystal panel provided further at the front of the diffusion unit. To light the plurality of the fluorescent lamps 11, a high voltage is applied to the lamps 11 from an inverter power circuit (not shown).

Figure 2:
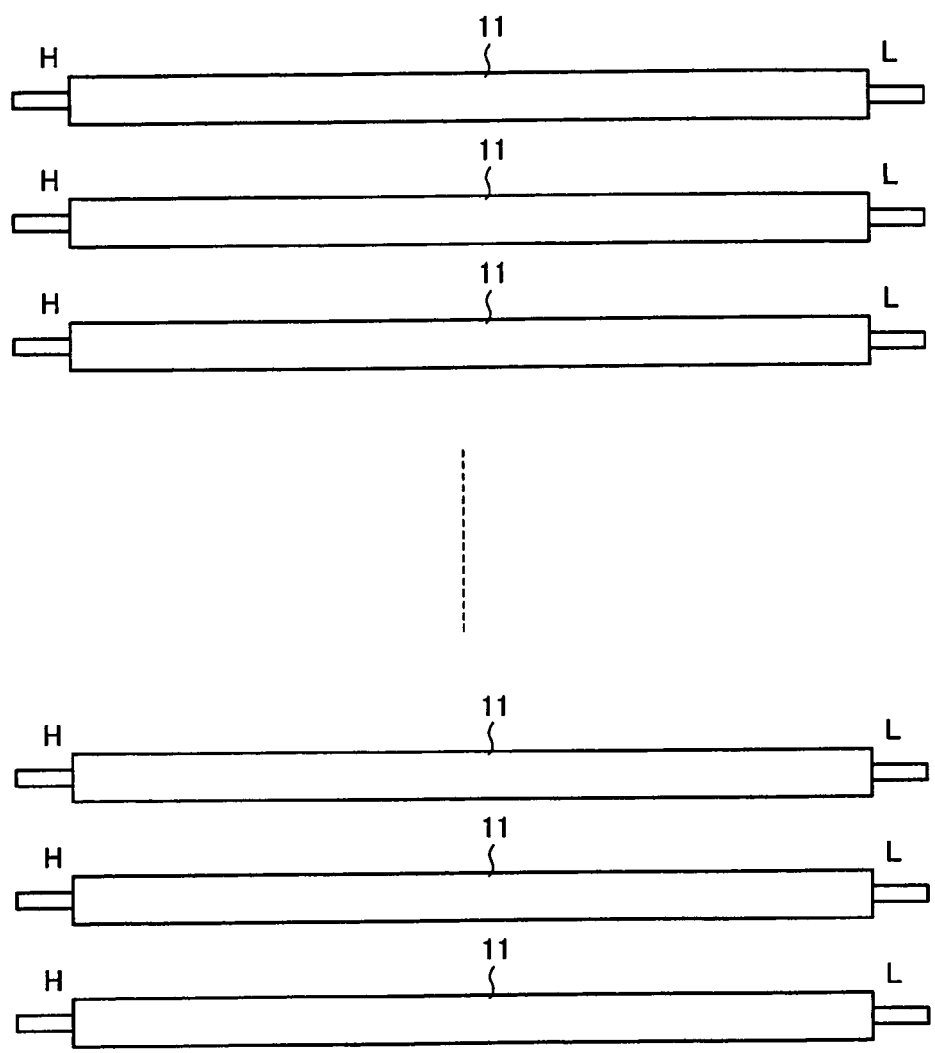
FIG. 2 is an explanatory view of a layout example of fluorescent lamps in a backlight unit applied to the present invention.

FIG. 2 is an explanatory view of the layout of the fluorescent lamps 11, schematically illustrating a plan layout of the lamps. Here, the plurality of the fluorescent lamps 11 are laid out so as to be longitudinally parallel to each other. The high- and low-voltage sides H and L of the fluorescent lamps 11 are arranged at the same sides so that the high-voltage side H of each of the lamps 11 is adjacent to that of another lamp and that the low-voltage side L of each of the lamps is adjacent to that of another lamp.

The fluorescent lamps 11 have an uneven brightness that causes the brightness of the high-voltage side to be relatively higher in the longitudinal relative brightness distribution as described above. In the present embodiment, the reflection layer 13 is provided with the brightness compensation means tailored for the uneven brightness of the fluorescent lamps 11 to compensate for the uneven brightness in the longitudinal direction inherently present in the lamps 11 and achieve a display screen with an even brightness.

As such brightness compensation means, two possible means are available. The first is to reduce the reflectance of the reflection layer 13 at the portion of the fluorescent lamps 11 that is relatively high in brightness (high-voltage side H). The second is to increase the reflectance of the reflection layer 13 at the portion of the fluorescent lamps 11 that is relatively low in brightness (low-voltage side L). These two means may also be used in combination.

As an example of the brightness compensation means, a dot pattern is imparted to the reflection layer 13 to control the reflectance. The dot pattern controls the reflectance of the outgoing light from the fluorescent lamps 11, thus compensating for the uneven brightness developed by the fluorescent lamps 11 in the longitudinal direction.

Figure 3:
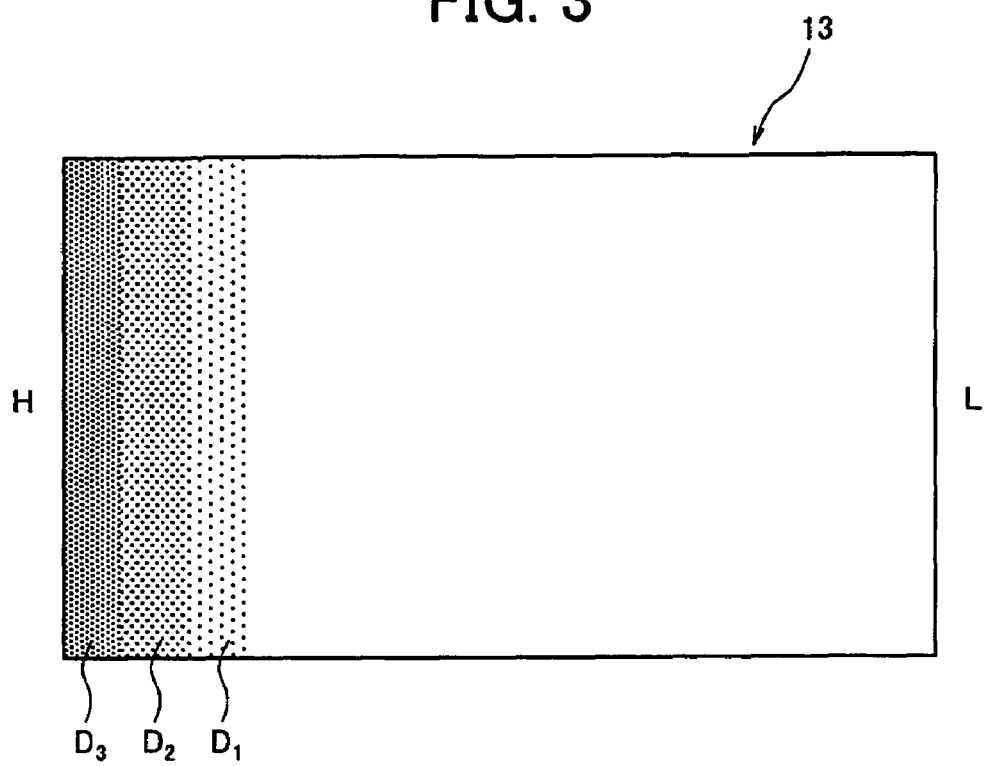
FIG. 3 is an explanatory view of an example of a dot pattern imparted to a reflection layer.
Figure 4A:
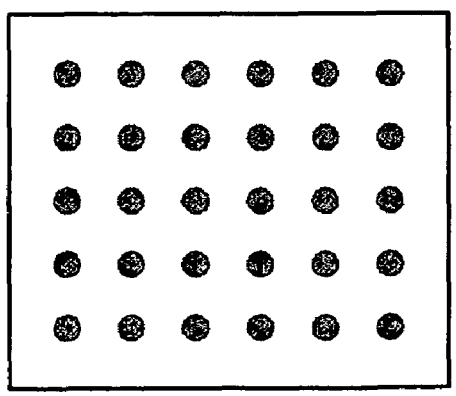
FIGS. 4A and 4B are expanded views of the dot pattern of the reflection layer shown in FIG. 3.
Figure 4B:
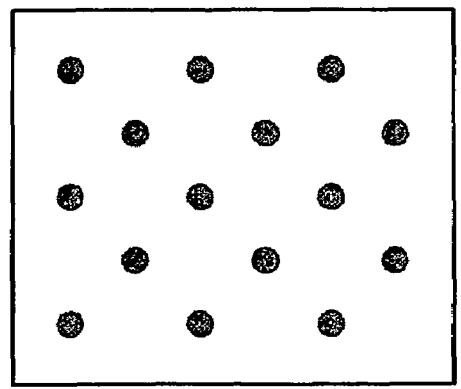

FIG. 3 is an explanatory view of an example of the dot pattern imparted to the reflection layer 13. On the other hand, FIGS. 4A and 4B are expanded views of the dot pattern of the reflection layer shown in FIG. 3. FIG. 4A is an expanded view of a region $D_3$ in FIG. 3, whereas FIG. 4B is an expanded view of a region $D_1$ in FIG. 3.

In the present embodiment, the dot pattern imparted to the reflection layer 13 reduces the reflectance of the layer 13. The reflectance of the material making up the dot pattern is relatively lower than that of the surface of the reflection layer.

Figure 18:
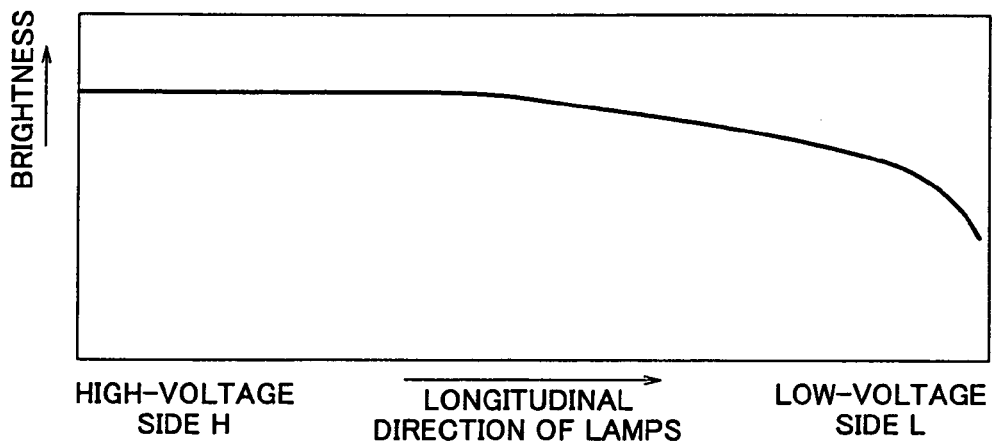
FIG. 18 is an explanatory view of an example of the relative brightness distribution characteristic in the longitudinal direction (in the direction of voltage application) of the fluorescent lamps.

In the present embodiment, the reflection layer 13 is provided, as shown in FIG. 3, with regions $D_1$, $D_2$ and $D_3$, i.e., the regions whose reflectance decreases in stages from the low-voltage side L to the high-voltage side H of the fluorescent lamps 11. These regions are formed so as to correspond to the uneven brightness of the fluorescent lamps 11 and compensate for the uneven brightness of the fluorescent lamps 11. In the present embodiment, the dot pattern, equivalent to the brightness distribution compensation in FIG. 18, is imparted to the reflection layer 13.

The dot pattern imparted to the reflection layer 13 in the present embodiment has a dot density increasing in stages from the low-voltage side L to the high-voltage side H of the fluorescent lamps 11 in the regions $D_1$, $D_2$ and $D_3$ with the dot pattern so as to reduce the reflectance from the low-voltage side L to the high-voltage side H. As shown in FIGS. 4A and 4B, for example, the dots of the dot pattern are equally sized, and the dot pattern closer to the high-voltage side H has a higher dot density. This changes the reflectance of the reflection layer 13 correspondingly with the uneven brightness in the longitudinal direction of the fluorescent lamps 11, thus achieving an illuminating light with an even brightness distribution.

To control the reflectance of the reflection layer with a dot pattern, while the reflectance of the reflection layer 13 can be controlled by imparting to this layer a dot pattern to reduce the reflectance of the reflection surface of the reflection layer 13 as described above, the reflectance of the reflection layer 13 may be controlled by imparting to this layer a dot pattern to increase the reflectance of the reflection surface of the reflection layer 13. In this case, a dot pattern adapted to relatively increase the reflectance is provided in the region of the reflection layer 13 with a relatively low brightness in terms of the brightness distribution of the fluorescent lamps 11. For example, if a foamed PET sheet is used for the reflection layer 13, a dot pattern, made of a high reflectance material such as silver or aluminum, is imparted to the region of the reflection layer 13 corresponding to the low brightness region of the fluorescent lamps 11. This allows to compensate for the uneven brightness in the longitudinal direction of the fluorescent lamps 11.

On the other hand, the dot pattern adapted to control the reflectance as described above, may not only vary the equally shaped dot density as shown in the example of FIGS. 3 and 4A and 4B but also the dot shape (size) to control the reflectance. Further, the dot shape and density may be used in combination. Further, taking advantage of the change in the reflectance with change in the dot color, the dot color as well as the dot shape and density may be used in combination to control the reflectance. For example, the dot shape of the dot pattern may be circular, triangular, polygonal, star-shaped or elliptical, whereas the dot color may be gray, dark brown, silver, green, black, white or purple.

Further, the dot pattern may impart a gradient that gradually reduces the reflectance from the low-voltage side L to the high-voltage side H (that is, gradually increases the reflectance from the high-voltage side H to the low-voltage side L) correspondingly with the uneven brightness of the fluorescent lamps 11, rather than changes the reflectance in stages as shown in the example of FIG. 3. Such a reflectance gradient can be realized when the dot shape, size, density and color are used alone or in combination with each other.

Ink can be imparted to the reflection layer 13, for example, through screen or ink jet printing to form the dot pattern imparted to the reflection layer 13. In addition to printing, the dot pattern may be formed using other means, namely, sputtering, vapor deposition, photolithography, optical machining using a laser beam or lamination of clear dot-patterned films.

As another specific example of the brightness compensation means, the reflection layer 13 can be coated with an ink or dye with varying concentration to reduce or increase the reflectance of the reflection unit gradually or in stages. To change the concentration at this time, the concentration of the dye or pigment itself may be varied, or the thickness of the film applied may be varied to change the apparent concentration.

Moreover, a plurality of materials with different reflectances may be imparted to the surface of the reflection layer 13 as the brightness compensation means to change the reflectance in stages. Further, the surface roughness of the reflection layer 13 may be varied to control the reflectance based on the difference of the optical diffusion or absorption characteristic of the surface.

Further, two different measures, one to relatively reduce the reflectance of the reflection layer 13 and the other to increase it as described above, may be used in combination to control the reflectance of the reflection layer 13.

Embodiment 2

Figure 5:
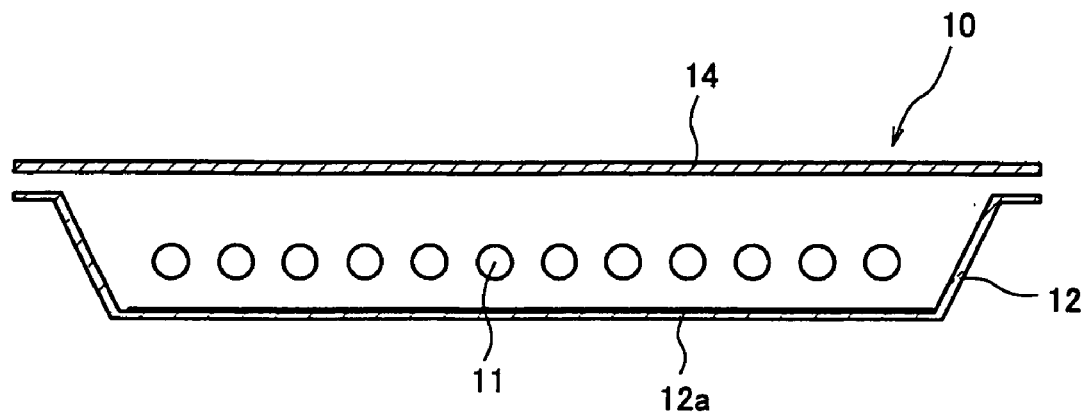
FIG. 5 is an explanatory view of another embodiment of the backlight unit according to the present invention.

FIG. 5 is an explanatory view of still another embodiment of the backlight unit according to the present invention, illustrating a schematic cross-section corresponding to the cross-section along line B-B of the backlight unit in FIG. 1A. The backlight unit of the present embodiment has, as the reflection unit, a reflection surface 12a adapted to reflect the light of the fluorescent lamps 11 toward the diffusion unit 14 in place of the reflection layer 13 in the embodiment 1. The reflection surface 12a is formed with a reflective film made of a high reflectance material such as silver or aluminum and provided on the inner surface at the bottom of the enclosure 12. On the other hand, the high- and low-voltage sides H and L of the fluorescent lamps 11 are arranged at the same sides as shown in FIG. 2.

In the present embodiment, the brightness compensation means are provided on the reflection surface 12a to control the optical reflectance as described in the embodiment 1. This compensates for the reflectance of the reflection surface 12a correspondingly with the longitudinal brightness distribution of the fluorescent lamps 11, thus achieving an illumination light with an even brightness distribution. As for a specific configuration of the brightness compensation means, the brightness compensation means in the embodiment 1 can be used. Therefore, duplicated description is omitted.

Embodiment 3

Figure 6:
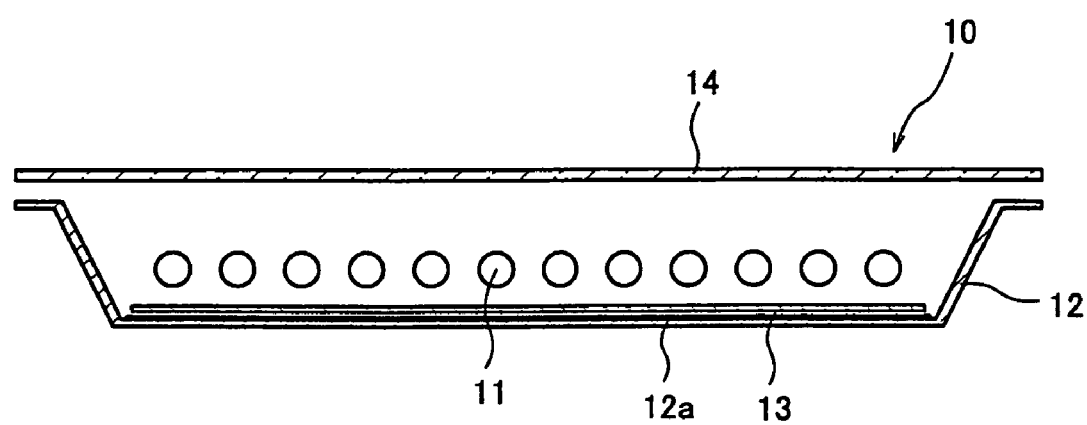
FIG. 6 is an explanatory view of still another embodiment of the backlight unit according to the present invention.

FIG. 6 is an explanatory view of still another embodiment of the backlight unit according to the present invention, illustrating a schematic cross-section corresponding to the cross-section along line B-B of the backlight unit in FIG. 1A. The backlight unit of the present embodiment has, as the reflection unit, the reflection layer 13 shown in the configuration of FIGS. 1A and 1B and the reflection surface 12a shown in FIG. 5. On the other hand, the high- and low-voltage sides H and L of the fluorescent lamps 11 are arranged at the same sides as shown in FIG. 2.

The enclosure 12 of the backlight unit 10 is provided with the reflection layer 13 as described in embodiment 1. While the reflection layer 13, made, for example, of the foamed PET sheet, is capable of reflecting the light from the fluorescent lamps 11, part of the light passes through the reflection layer 13 to emerge at the rear side. The reflection surface 12a as described in the embodiment 2 is provided on the inner surface at the bottom of the backlight unit 10. This surface reflects the light passing through the reflection layer 13 back toward the reflection layer 13. The light reflected by the reflection surface 12a is separated again into reflected and transmitted lights at the reflection layer 13. The transmitted light travels toward the diffusion unit 14 so that it will be effectively used.

The reflection layer 13 is supported using a supporting body in the shape of a frame and a lamp holder or supporting members such as screws or stays. The reflection layer 13 allows an air layer to mediate between this layer 13 and the reflection surface 12a without coming in close contact with the reflection surface 12a. To allow the mediation of the air layer, while a given gap may be provided between the reflection layer 13 and the reflection surface 12a, it suffices to simply place and support the reflection layer 13 on the reflection surface 12a. That is, because of the presence of a thin air layer on the back surface of the reflection layer 13, the difference in refraction index between the reflection layer 13 and air becomes greater on the back surface of the reflection layer 13. This will enhance the reflectance of the reflection layer 13. For example, if a material such as an adhesive having a refraction index close to that of the reflection layer 13 is provided on the back surface of this layer 13, the component of transmitted light increases at the reflection layer 13. This will impair the optical reflection characteristic.

While, in the present embodiment, the brightness compensation means described in the aforementioned embodiment may be imparted to the reflection layer 13 to achieve an even illumination light, the above means may be further imparted to both of the reflection layer 13 and the reflection surface 12a or only to the reflection surface 12a. The brightness compensation means imparted to the reflection surface 12a contributes only to transmitted light passing through the reflection layer 13. Therefore, the reflectance distribution must be designed based on the reflectance (that is, transmittance) of the reflection layer 13.

Embodiment 4

Figure 7A:
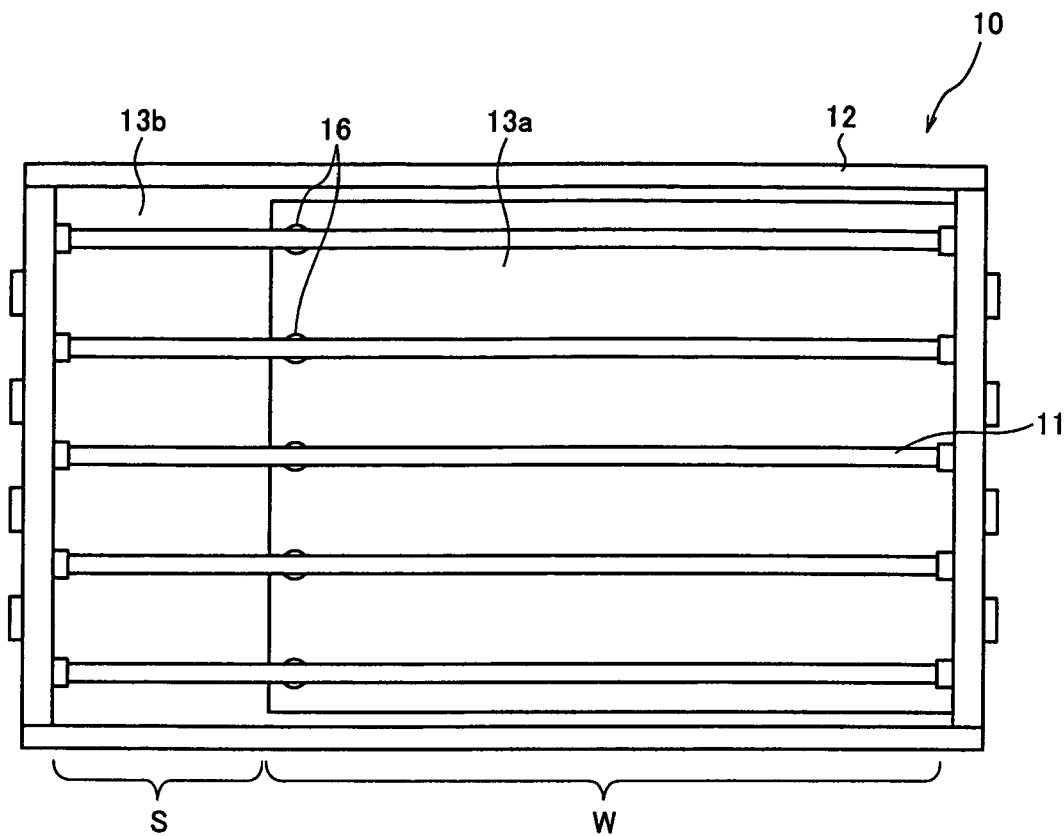
FIGS. 7A and 7B are explanatory views of still another embodiment of the backlight unit according to the present invention.
Figure 7B:
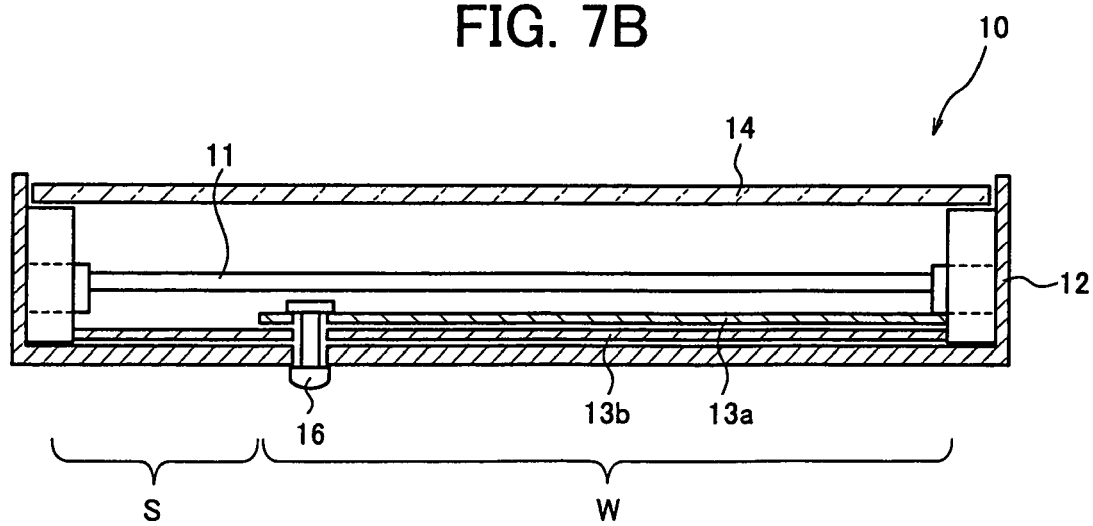

FIGS. 7A and 7B are explanatory views of still another embodiment of the backlight unit according to the present invention. FIG. 7A is a plan schematic view illustrating the inside of the backlight unit, whereas FIG. 7B illustrates a configuration, including the diffusion unit 14, on the cross-section along the fluorescent lamps 11 in FIG. 7A. In FIGS. 7A and 7B, reference numeral 16 denotes screws used as the holding means of reflection layers 13a and 13b. On the other hand, the high- and low-voltage sides H and L of the fluorescent lamps 11 are arranged at the same sides as shown in FIG. 2.

The backlight unit of FIGS. 7A and 7B is provided with the two reflection layers 13a and 13b to emit the light from the fluorescent lamps in a specific direction. The reflection layers 13a and 13b each have a characteristic similar to the aforementioned foamed PET sheet, thus reflecting light at a high reflectance. However, part of the incident light passes through the reflection layers to the rear side. In the present embodiment, two regions are provided, a region W with the reflection layers 13a and 13b stacked one above another vertically (in the direction of incidence of light) and a region S with only the reflection layer 13b.

As described above, part of the incident light passes through the reflection layers 13a and 13b to the rear side. In the region W with the reflection layers 13a and 13b stacked one above another, the transmitted light passing through the reflection layer 13a, i.e., the first layer provided on the front side (side of the fluorescent lamps 11), is reflected by the reflection layer 13b, i.e., the second layer provided on the rear side, back to the first reflection layer 13a. The transmitted light passing through the first reflection layer 13a travels toward the diffusion unit 14 so that it will be effectively used.

In the region S with only the second reflection layer 13b, on the other hand, although the light reflected by this layer 13b is effectively used, the transmitted light passing through the reflection layer 13b disappears or becomes diffused at the rear side thereof. Even if the transmitted light returns to the reflection layer 13b as a result of reflection, for example, by the inner surface of the enclosure 12, only a small percentage of such a light will be effectively used. Therefore, when the regions W and S are compared, the region W with the two stacked reflection layers 13a and 13b achieves a relatively higher reflectance than the region S with only the reflection layer 13b.

It is to be noted that although the second reflection layer 13b on the rear side is larger than the first reflection layer 13a on the front side to form the regions W and S in the configuration of FIGS. 7A and 7B, the first reflection layer 13a may be larger.

Using the two reflection layers 13a and 13b, the region W having these layers is provided at the low brightness area of the fluorescent lamps 11. This ensures a relatively higher reflectance, thus achieving an illumination light with an even brightness distribution.

A half mirror may be used, for example, for the first reflection layer 13a. Using the half mirror enhances the transmittance of the light reflected by the second reflection layer 13b back to the first reflection layer 13a (half mirror), thus achieving a high reflectance.

On the other hand, the brightness compensation means as described in the embodiments 1 to 3 may be used in combination with the configuration having the two reflection layers 13a and 13b.

When the two regions, i.e., the region W with the reflection layers 13a and 13b stacked one over another and the region S with only the reflection layer 13b, are formed as in the present embodiment, holding members are preferably provided on each of the reflection layers 13a and 13b, and particularly, on the layer 13a on the front side to impart a holding stability. For example, through-holes are made in all of the members, i.e., the enclosure 12 and the first and second reflection layers 13a and 13b, as shown in FIGS. 7A and 7B. Then, the screws 16 are inserted into the through-holes to hold the reflection layers 13a and 13b with the inner surface of the enclosure 12. This suppresses the bending of the reflection layers 13a and 13b due to the gravity and the like, thus maintaining their shapes. It is to be noted that not only screws but also publicly known means that can hold reflection layers 13a and 13b with the inner surface of the enclosure can be used as the holding means.

It is to be noted that, to prevent the holding means such as the screws 16 from showing up on the display screen, the holding means are preferably arranged so as to be hidden behind the fluorescent lamps 11 as shown in FIG. 7B. Further, the holding means may be provided with a capability to hold the reflection layers 13a and 13b and another to hold the fluorescent lamps 11.

Embodiment 5

FIG. 8 is an explanatory view of still another embodiment of the backlight unit according to the present invention, illustrating the fluorescent lamp 11 in a plan schematic view. In the present embodiment, the glass tube making up the fluorescent lamp 11 is provided with the brightness compensation means to compensate for the uneven brightness of the lamp 11 and achieve a light with an even brightness distribution. Here, the brightness compensation means provided on the glass tube are used to control the optical transmittance of the glass tube of the fluorescent lamp 11, rather than control the reflectance as described in the aforementioned embodiments. However, both means share the same technical principle of controlling the amount of light emitted to the target to ensure an even brightness.

Figure 19:
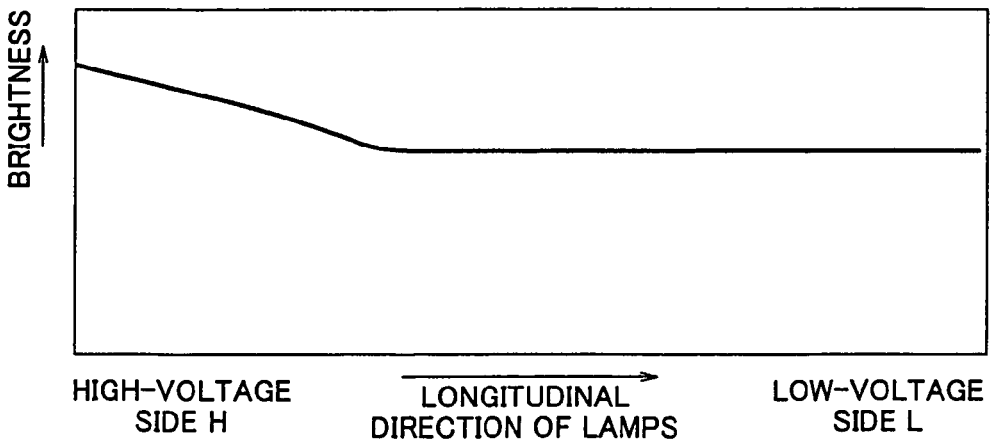
FIG. 19 is a graph illustrating the relative brightness characteristic in the longitudinal direction (in the direction of voltage application) of the fluorescent lamps when a drive voltage, applied to the fluorescent lamps having the brightness gradient shown in FIG. 18, is further raised.
Figure 20A:
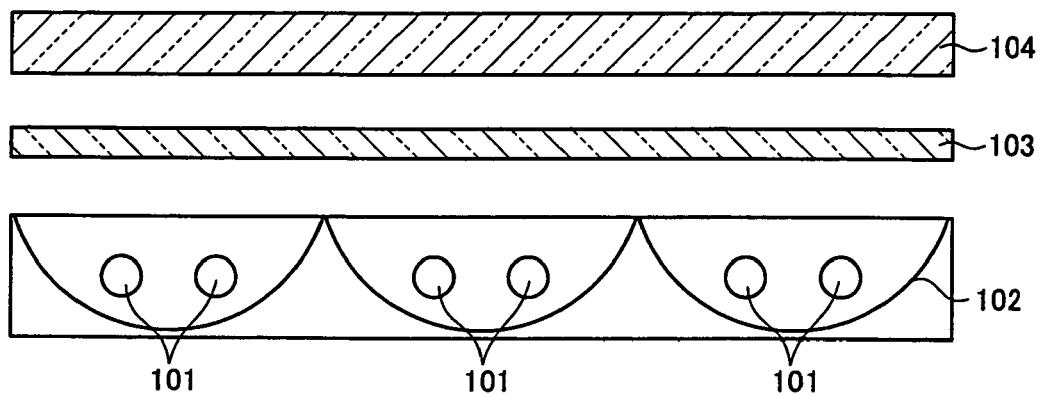
FIGS. 20A and 20B are explanatory views of an example of the liquid crystal display device having a conventional direct type backlight unit.
Figure 20B:
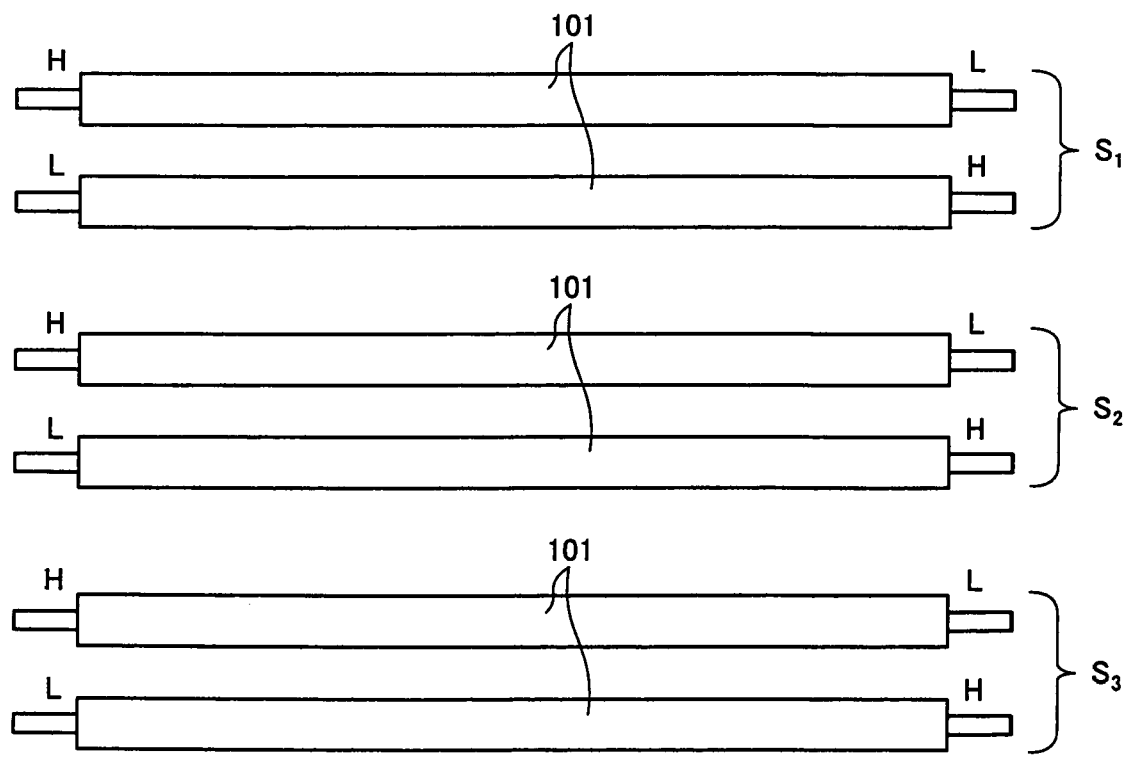
Figure 21A:
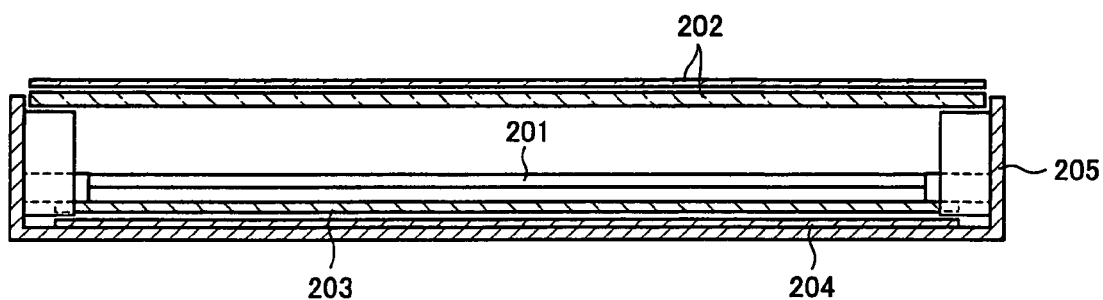
FIGS. 21A and 21B illustrate another example of the backlight unit in the conventional liquid crystal display device.
Figure 21B:
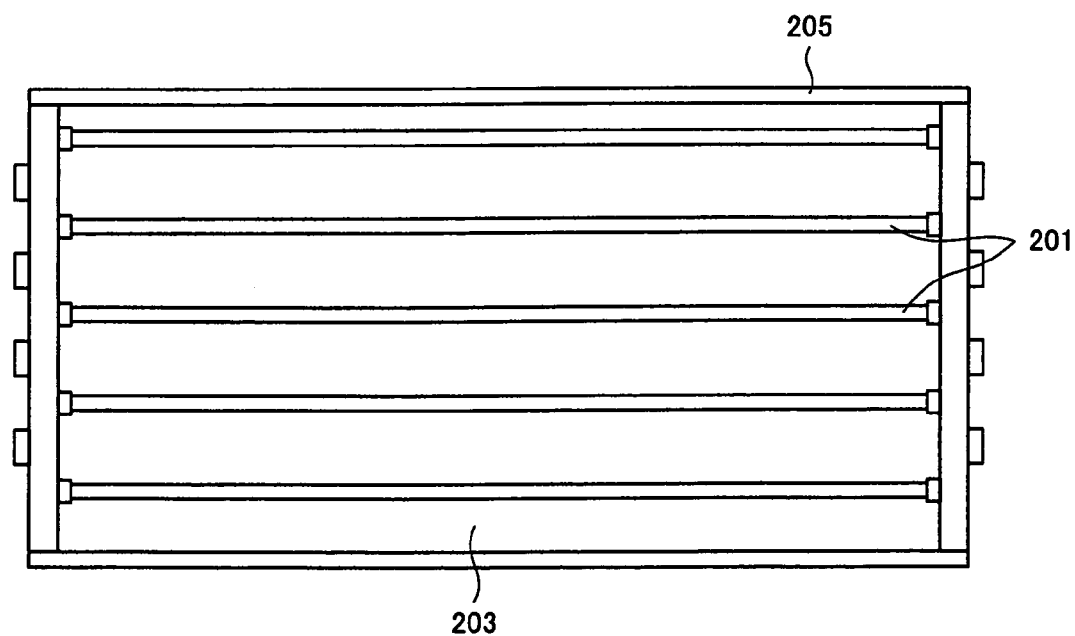

In FIG. 8, a dot pattern is used as the brightness compensation means to reduce the optical transmittance of the glass tube. Here, three dot pattern regions with different densities, namely, regions $D_{11}$, $D_{12}$ and $D_{13}$, are disposed such that the dot density increases in stages from the low-voltage side L to the high-voltage side H of the fluorescent lamp 11. The regions $D_{11}$, $D_{12}$ and $D_{13}$ are formed to correspond to and compensate for the uneven brightness of the fluorescent lamp 11. In the present embodiment, the dot pattern, equivalent to the brightness distribution compensation in FIG. 19, is imparted to the glass tube of the fluorescent lamp 11.

With the dot pattern imparted to the reflection layer 13 in the present embodiment, the dot density is increased in stages from the low-voltage side L to the high-voltage side H of the fluorescent lamp 11 in the dot pattern regions $D_{11}$, $D_{12}$ and $D_{13}$ so as to reduce the transmittance from the low-voltage side L to the high-voltage side H of the lamp 11. As shown in FIG. 8, for example, the dots of the dot pattern are equally sized, and the dot density of the dot pattern is higher in the region closer to the high-voltage side H. This changes the transmittance of the glass tube correspondingly with the uneven brightness in the longitudinal direction of the fluorescent lamp 11, thus achieving an illumination light with an even brightness distribution.

The dot pattern adapted to control the transmittance as described above may change not only the density of the equally-shaped dots as shown in FIG. 8 but also the dot shape (size). Further, the dot shape and density may be used in combination. Further, the dot color may be changed to change the transmittance. For example, the dot shape of the dot pattern may be circular, triangular, polygonal, star-shaped or elliptical, whereas the dot color may be gray, dark brown, silver, green, black, white or purple.

Further, the dot pattern, as described above, may impart a gradient that gradually reduces the transmittance from the low-voltage side L to the high-voltage side H in correspondence with the uneven brightness of the fluorescent lamp 11 without changing the transmittance in stages as shown in the example of FIG. 8. Such a transmittance gradient can be realized when the dot shape, size, density and color are used alone or in combination with each other.

Ink is imparted to the glass tube, for example, through screen or ink jet printing to form the dot pattern imparted to the glass tube surface. In addition to printing, the dot pattern may be formed using other means, namely, sputtering, vapor deposition, photolithography, optical machining using a laser beam or lamination of clear films with a dot pattern.

As another specific example of the brightness compensation means imparted to the glass tube of the fluorescent lamp 11, the glass tube can be coated with an ink or dye with varying concentration to reduce or increase the transmittance in stages or gradually. To change the concentration at this time, the concentration of the dye or pigment itself may be varied, or the thickness of the film applied may be varied to change the apparent concentration.

Moreover, a plurality of materials with different transmittances may be imparted to the glass tube surface as the brightness compensation means. Further, the surface roughness of the glass tube may be varied to control the transmittance based on the difference of the optical diffusion or absorption characteristic of the surface.

Embodiment 6

FIGS. 9A to 9D are explanatory views of still another embodiment of the backlight unit according to the present invention. FIG. 9A is a cross-sectional schematic view of the backlight unit, whereas FIGS. 9B to 9D are cross-sectional schematic views of the fluorescent lamp 11 taken respectively along cross-section lines B-B, C-C and D-D in FIG. 9A. In FIGS. 9A to 9D, reference numeral 11a denotes a glass tube making up the fluorescent lamp, 11b a fluorescent substance provided on the inner surface of the glass tube and d a film thickness of the fluorescent substance.

In the present embodiment, the brightness compensation means adapted to compensate for the uneven brightness of the fluorescent lamp 11 and achieve a light with an even brightness distribution change the film thickness d of the fluorescent substance 11b formed on the inside of the glass tube 11a of the fluorescent lamp 11 in the longitudinal direction of the fluorescent lamp 11 to compensate for the uneven brightness of the fluorescent lamp 11 during lighting.

That is, the present embodiment takes advantage of the change in tube surface brightness with variation in the film thickness d of the fluorescent substance 11b to change the film thickness d of the fluorescent substance 11b correspondingly with the longitudinal position of the fluorescent lamp 11 and achieve an even radiation brightness in the longitudinal direction of the fluorescent lamp 11. In the example of FIGS. 9A to 9D, the film thickness d of the fluorescent substance is optimal for maximum brightness at the low-voltage side L of the fluorescent lamp 11 with relatively low brightness, and the film thickness d is increased toward the high-voltage side H with relatively high brightness.

Figure 10:
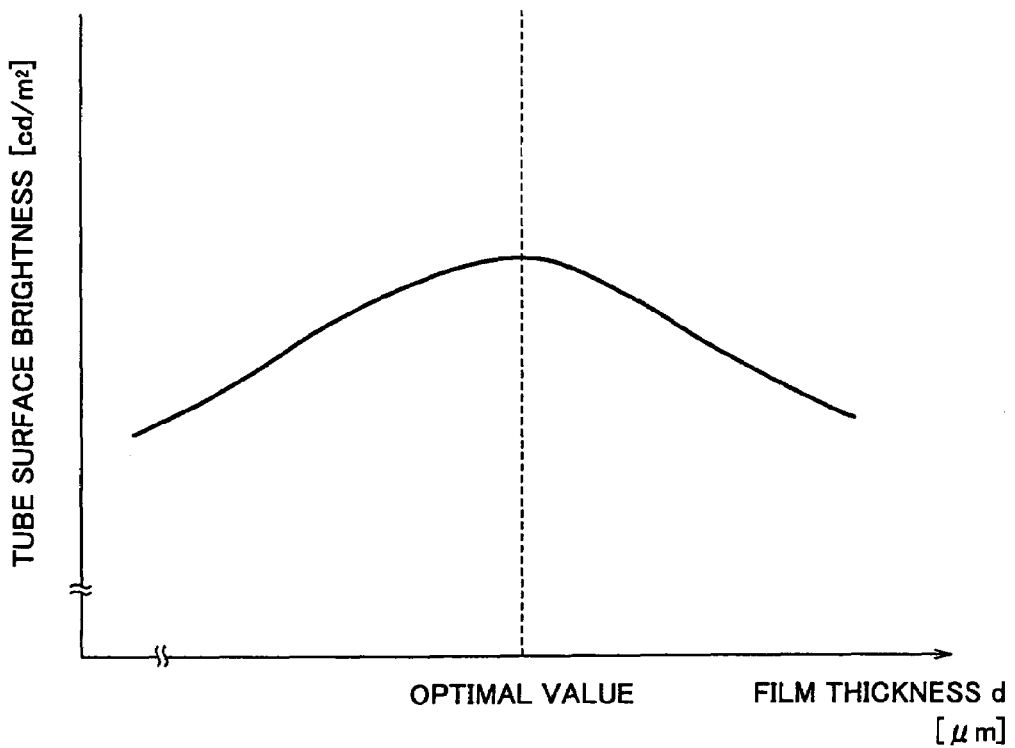
FIG. 10 illustrates an example of the relationship between the film thickness of a fluorescent substance and the tube surface brightness at that time.

FIG. 10 illustrates an example of the relationship between the film thickness d of the fluorescent substance and the tube surface brightness (radiation brightness) at that time. As shown in FIG. 10, the brightness of the lamp during lighting generally changes correspondingly with the film thickness d of the fluorescent substance, regardless of what the fluorescent substance is made of. The optimal value for the film thickness d exists that allows the fluorescent substance to emit the brightest light. That is, as shown in FIG. 10, if the film thickness d is smaller than the optimal value, the light is darker due to the lack of the fluorescent substance, whereas if the film thickness d is greater than the optimal value, the light is also darker due to the scattering of light in the film.

The present embodiment conversely takes advantage of the above-described characteristic to change the film thickness d of the fluorescent substance 11b from the low-voltage side L of the fluorescent lamp 11 with relatively low brightness to the high-voltage side H thereof with higher brightness. At this time, the brightness declines irrespective of whether the film thickness d is smaller or greater than the optimal value as described above. For example, therefore, the fluorescent substance 11b at the low-voltage side L with lower brightness is set to the optimal film thickness, and the film thickness d is reduced or increased toward the high-voltage side H with relatively high brightness.

It is to be noted that, as described in embodiments 5 and 6, the method of imparting the brightness compensation means to the glass tube itself of the fluorescent lamp 11 can be applied not only to a straight tube fluorescent lamp but also to U-shaped, block C-shaped and L-shaped fluorescent lamps.

Embodiment 7

Figure 11:
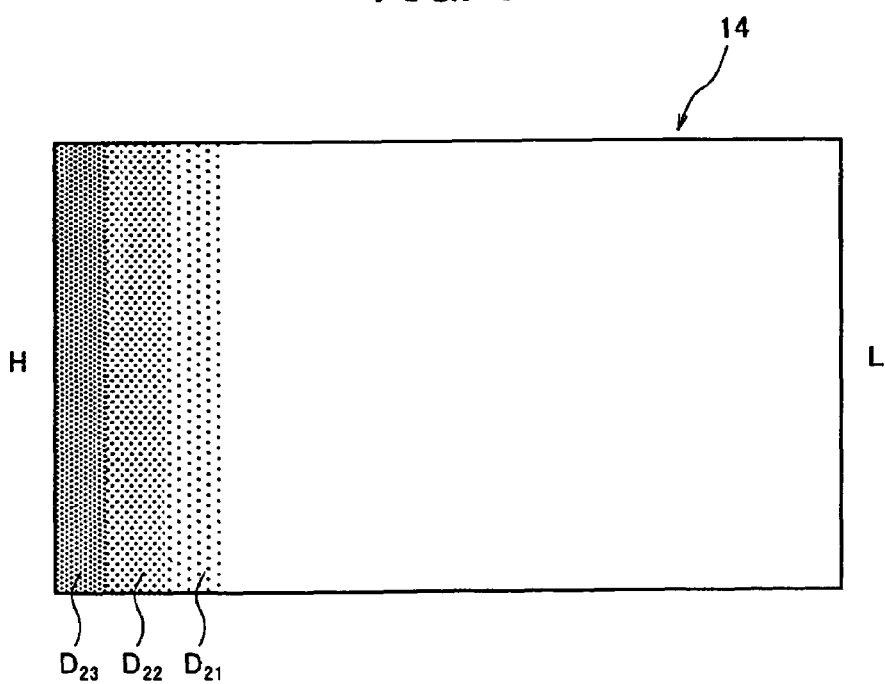
FIG. 11 is an explanatory view of still another embodiment of the backlight unit according to the present invention.

FIG. 11 is an explanatory view of still another embodiment of the backlight unit according to the present invention. In the present embodiment, the diffusion unit 14 is provided with the brightness compensation means to compensate for the uneven brightness in the longitudinal direction of the lamps and achieve a light with an even brightness distribution. A diffusion plate or sheet capable of diffusing light is used for the diffusion unit 14. The brightness compensation means are provided on the surface of the diffusion unit 14 to control the optical transmittance.

For example, a dot pattern is imparted to the surface of the diffusion unit 14 as shown in FIG. 11 to reduce the optical transmittance. Here, three dot pattern regions with different densities, namely, regions $D_{21}$, $D_{22}$ and $D_{23}$, are disposed such that the dot density increases in stages from the low-voltage side L to the high-voltage side H of the fluorescent lamps 11. The regions $D_{21}$, $D_{22}$ and $D_{23}$ are formed to correspond to and compensate for the uneven brightness in the longitudinal direction of the fluorescent lamps 11. Here, the dot pattern is preferably provided on the back side (side of the fluorescent lamps 11) rather than on the front side (side opposite to the fluorescent lamps 11) of the diffusion unit 14 because of a smaller likelihood of the dot pattern to hinder the even diffusion characteristic of the diffusion unit 14 across the surface.

In addition to the above, the aforementioned brightness compensation means provided on the fluorescent lamps 11 in the embodiment 5 may be used in the same manner as the brightness compensation means to control the optical transmittance as described above. In the present embodiment, on the other hand, the thickness of the diffusion unit 14 may be changed correspondingly with the uneven brightness in the longitudinal direction of the fluorescent lamps 11 to change the transmittance of the light passing through the diffusion unit 14 and compensate for the uneven brightness of the fluorescent lamps 11.

Embodiment 8

While the configuration examples of the direct type backlight unit have been described in the above embodiments, the backlight unit according to the present invention may be applied to the edge light type as well as to the direct type. That is, the brightness compensation means imparted to the reflection layer or surface making up the reflection unit, the fluorescent lamps and the diffusion unit are not specifically applicable to the direct type backlight units. Instead, the brightness compensation means can compensate for the uneven brightness in the longitudinal direction of the fluorescent lamp in the edge light type backlight units to achieve an illumination light with an even brightness.

Figure 12A:
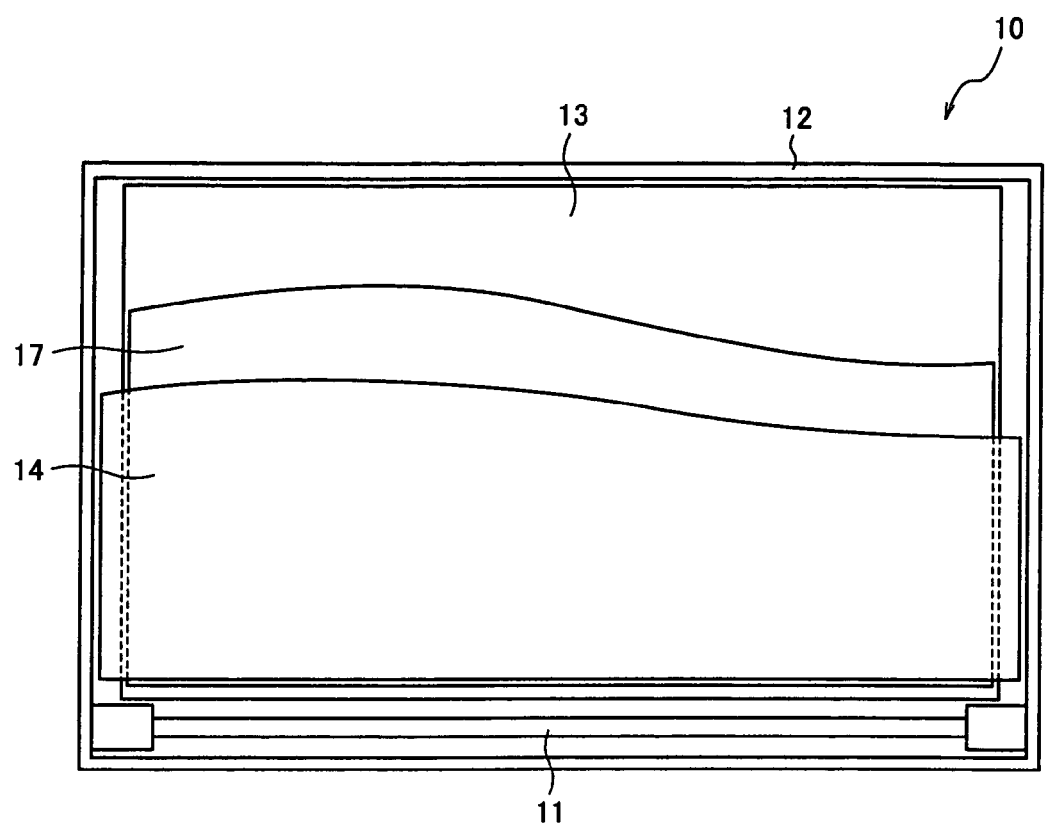
FIGS. 12A and 12B illustrate a configuration example of the edge light type backlight unit according to the present invention.
Figure 12B:
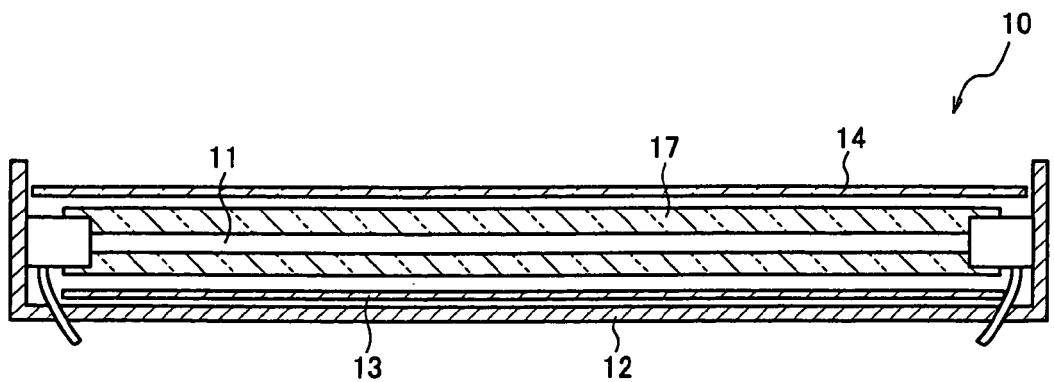

Description will be given of an example of the edge light type backlight unit. FIGS. 12A and 12B are explanatory views of a configuration example of the edge light type backlight unit according to the present invention. FIG. 12A is an explanatory view with some of the components removed in a plan schematic view of the backlight unit, whereas FIG. 12B illustrates a cross-sectional configuration along the longitudinal direction of the fluorescent lamps.

With the edge light type backlight unit 10 shown in FIGS. 12A and 12B, the fluorescent lamp 11 is arranged at the side of a light guide plate 17 as an edge light. The reflection layer 13 is provided at the back of the light guide plate 17. The light of the fluorescent lamp 11 is guided to the front by the light guide plate 17 and the reflection layer 13 and then emitted from the surface of the diffusion unit 14 as an illumination light. The reflection layer 13, i.e., the layer equivalent to the reflection layer 13 in the first embodiment, can be formed with a foamed PET sheet or a material having a high reflectance reflection surface made, for example, of silver or aluminum.

Thus, the brightness compensation means described in the above embodiments are imparted to one or a plurality of the reflection layer 13, the fluorescent lamp 11 and the diffusion unit 14 correspondingly with the uneven brightness of the fluorescent lamp 11. This compensates for the uneven brightness in the longitudinal direction of the fluorescent lamp 11 in the edge light type backlight unit as well, thus achieving an illumination light with an even brightness. That is, as for the fluorescent lamp 11, it suffices to provide the brightness compensation means to compensate for the uneven brightness from the high-voltage side H to the low-voltage side L of the lamp 11. As for the reflection layer 13 and the diffusion unit 14, on the other hand, it suffices to impart the brightness compensation means as described above correspondingly with the uneven brightness of the light emitting surface of the light guide plate 17 resulting from the uneven brightness from the high-voltage side H to the low-voltage side L of the fluorescent lamp 11.

Embodiment 9

When configured with a backlight unit having the brightness compensation means as shown in the above embodiments, the liquid crystal display device offers a high-quality display image free of uneven brightness on the display screen.

Figure 13:
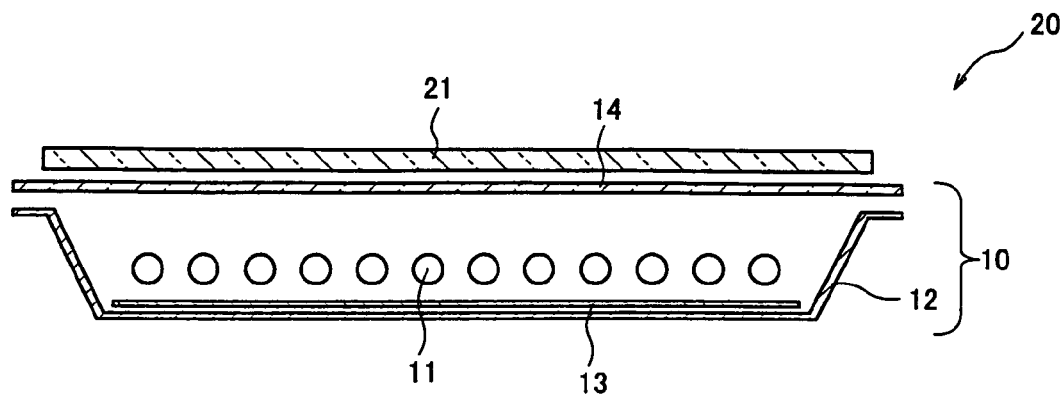
FIG. 13 is an explanatory view of an embodiment of a liquid crystal display device according to the present invention.

FIG. 13 is an explanatory view of an embodiment of the liquid crystal display device according to the present invention, illustrating a cross-sectional schematic configuration of the liquid crystal display device having a backlight unit. In FIG. 13, reference numeral 20 denotes a liquid crystal display device and 21 a liquid crystal panel.

The liquid crystal display device 20 has the ordinary liquid crystal panel 21, mainly configured by a liquid crystal material sealed between two clear insulating substrates, and the backlight unit 10 operable to apply light to the liquid crystal panel 21. The backlight unit according to one of the first to eighth embodiments can be used for the backlight unit 10 in the liquid crystal display device 20 according to the present embodiment.

When the liquid crystal panel 21 is illuminated with the backlight unit 10 provided with the brightness compensation means according to the present invention, the uneven brightness is compensated for in the longitudinal direction of the fluorescent lamps 11. This achieves an illumination light with even brightness, thus achieving a high-quality display screen free of uneven brightness on the liquid crystal panel 21.

As described above, the liquid crystal display device 20 ensures a high light utilization efficiency when a polarizing reflective film, that is not shown, is provided between the liquid crystal panel 21 and the diffusion unit 14 of the backlight unit 10. Here, the polarization transmission axis of the polarizing reflective film is aligned with that of the polarizer at the incident side of the liquid crystal panel 21. Then, if, as a result of the diffusion or reflection of the polarization fraction reflected by the polarizing reflective film, for example, by the diffusion unit 14 or the reflection layer 13, the polarization fraction thereof in the orthogonal direction (fraction coinciding with the polarization transmission axis) occurs, this fraction passes through the polarizing reflective film and therefore can be used as the effective light to the liquid crystal panel 21. Thus, the polarizing reflective film can efficiently produce a uniformly polarized illumination light. A liquid crystal display device with high light utilization efficiency can be obtained when the polarization direction of this light coincides with the polarization axis of the polarizer at the incident side of the liquid crystal panel. Further, a functional film or sheet such as an ITO sheet, diffusion film or prism sheet may be provided between the polarizing reflective film and the diffusion unit 14.

Embodiment 10

Figure 14:
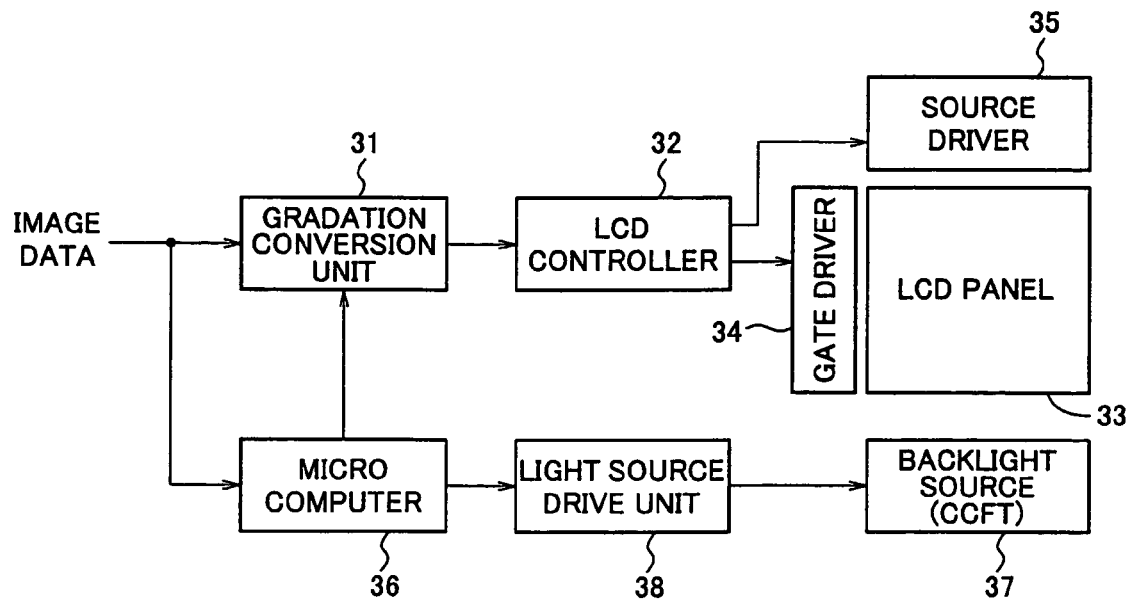
FIG. 14 is a block diagram of the major components illustrating a schematic configuration of another embodiment of the liquid crystal display device according to the present invention.
Figure 15:
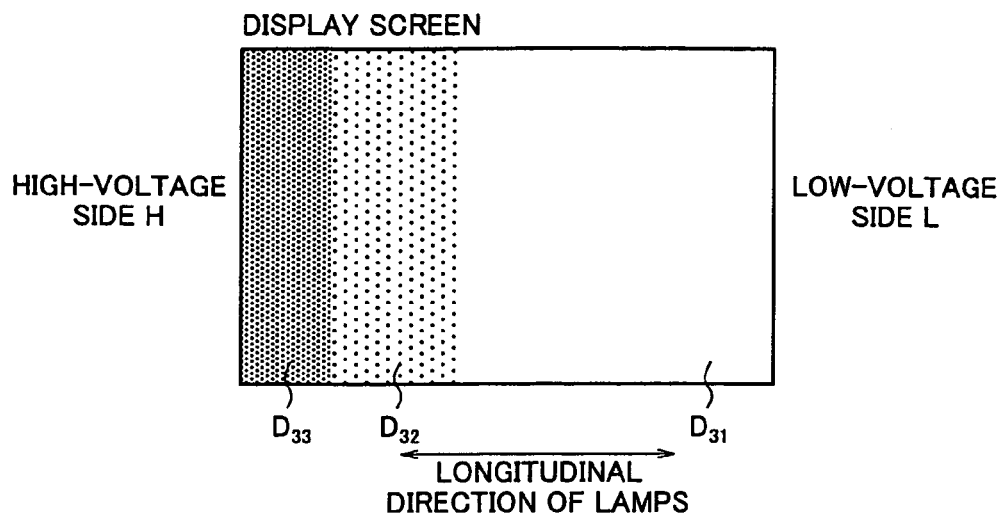
FIG. 15 is an explanatory view of the display screen region of the liquid crystal display device of FIG. 14.
Figure 16:
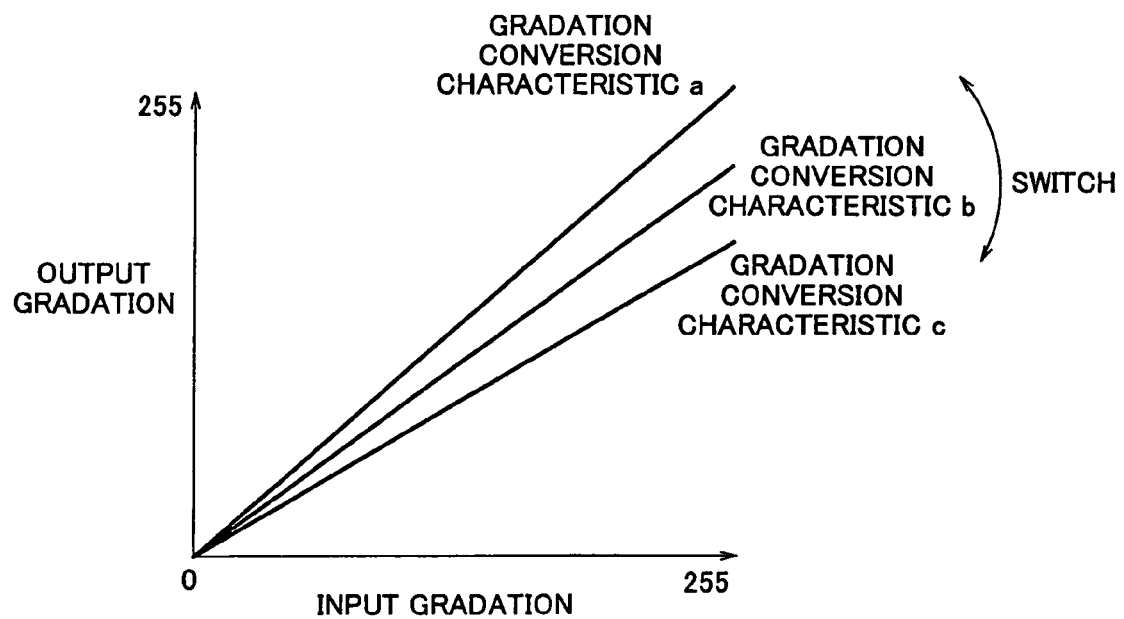
FIG. 16 illustrates gradation conversion characteristics (input/output characteristics) of a gradation conversion unit in the liquid crystal display device of FIG. 14.

The present embodiment controls the display image data supplied to the liquid crystal panel in the liquid crystal display device to compensate for the uneven brightness in the longitudinal direction of the fluorescent lamp and achieve a display screen with an even brightness. The present embodiment will be described below with reference to FIGS. 14 to 16. Here, FIG. 14 is a block diagram of the major components illustrating a schematic configuration of the liquid crystal display device according to the present embodiment. FIG. 15 is an explanatory view illustrating the display screen region in the liquid crystal display device according to the present embodiment. FIG. 16 is an explanatory view illustrating gradation conversion characteristics (input/output characteristics) of a gradation conversion unit in the liquid crystal display device according to the present embodiment.

As shown in FIG. 14, the liquid crystal display device according to the present embodiment is provided with a gradation conversion unit 31 operable to carry out a given gradation conversion process of input image data and an LCD control portion 32 operable to output an LCD drive signal to a gate driver 34 and a source driver 35 of a liquid crystal panel 33 based on the image data whose gradation has been converted by the gradation conversion unit 31. The liquid crystal display device is also provided with a microcomputer 36 that not only switches between the gradation conversion characteristics of the gradation conversion unit 31 based on a synchronizing signal of the input image data but also controls a light source drive unit 38 to drive a backlight source (linear fluorescent lamps) 37.

That is, the microcomputer 36 determines, based on the synchronizing signal of the input image data, the screen position to display the image data, and instructs the gradation conversion unit 31 to switch between the gradation conversion characteristics of the gradation conversion unit 31 based on the screen position. Here, we assume that the display screen is divided into three regions, as shown in FIG. 15, a region $D_{31}$ of the screen corresponding to the low-voltage side of the linear fluorescent lamps 37, a region $D_{32}$ of the screen corresponding to the slightly higher voltage side of the lamps 37 and a region $D_{33}$ of the screen corresponding to the highest voltage side of the lamps 37, and that the gradation conversion characteristic for the data is switched depending on which of the regions $D_{31}$ to $D_{33}$ is used to display the data.

The gradation conversion unit 31 has three gradation conversion characteristics as shown in FIG. 16 that can be switched from one to another, i.e., a gradation conversion characteristic a adapted to output the input gradation level as is (without converting it), a gradation conversion characteristic b adapted to output the gradation level after slightly suppressing the input level and a gradation conversion characteristic c adapted to output the gradation level after further suppressing the input level. The gradation conversion unit 31 may be configured, for example, with a lookup table (LUT) or a multiplication circuit adapted to multiply the input image data by a given coefficient. If the latter is used, the multiplication coefficient is switched to one of ka=1.0, ka=0.9 and ka=0.8 correspondingly with the control signal from the microcomputer 36. This causes the input image data to be multiplied by the multiplication coefficient, thus realizing three gradation conversion characteristics shown in FIG. 16, namely, the characteristics a to c.

When judging that the screen position to display the image data belongs to the region $D_{31}$ of the display screen, the microcomputer 36 outputs a control signal to the gradation conversion unit 31 to select the gradation conversion characteristic a. That is, the gradation conversion characteristic a is selected for the image data to be displayed in the region $D_{31}$ of the display screen. Therefore, the image data is output as is (without any conversion) to the LCD control portion 32. On the other hand, when judging that the screen position to display the image data belongs to the region $D_{32}$ of the display screen, the microcomputer 36 outputs a control signal to the gradation conversion unit 31 to select the gradation conversion characteristic b.

That is, the gradation conversion characteristic b is selected for the image data to be displayed in the region $D_{32}$ of the display screen. Therefore, the image data is subjected to a gradation conversion process. As a result, the display brightness is slightly reduced in the region $D_{32}$ of the display screen. Further, when judging that the screen position to display the image data belongs to the region $D_{33}$ of the display screen, the microcomputer 36 outputs a control signal to the gradation conversion unit 31 to select the gradation conversion characteristic c. That is, the gradation conversion characteristic c is selected for the image data to be displayed in the region $D_{33}$ of the display screen. Therefore, the image data is subjected to a gradation conversion process. As a result, the display brightness is further reduced in the region $D_{33}$ of the display screen.

This leads to a reduced amount of transmitted light passing through the liquid crystal panel 33 located at the high-voltage side of the linear fluorescent lamps 37 (reduced display brightness), thus realizing an even brightness distribution over the entire display screen. As described above, the present embodiment controls the gradation level of the image data correspondingly with the screen position to display the image data, thus reducing the uneven brightness in the longitudinal direction of the linear fluorescent lamps 37 and ensuring an even brightness distribution.

It is to be noted that while the display screen is divided into the three regions $D_{31}$ to $D_{33}$ correspondingly with the longitudinal position of the linear fluorescent lamps 37 in the above embodiment so that the gradation conversion characteristics a to c are selected for the image data displayed respectively in the regions $D_{31}$ to $D_{33}$, it is needless to say that the number of divisions of the display screen and the positions at which to divide the screen can be changed as appropriate correspondingly with the brightness distribution (uneven brightness) in the longitudinal direction of the linear fluorescent lamps 37.

On the other hand, the reference gradation voltage to drive the liquid crystal panel may be varied correspondingly with the display screen position of the liquid crystal panel to compensate for the uneven brightness in the longitudinal direction of the linear fluorescent lamps.

Embodiment 11

In the liquid crystal display device, the aperture ratio can be alternatively changed correspondingly with the display screen position of the liquid crystal panel to compensate for the uneven brightness in the longitudinal direction of the fluorescent lamps and provide a display screen with an even brightness. That is, the aperture ratio of the liquid crystal panel can be changed correspondingly with the longitudinal position of the linear fluorescent lamps to reduce the uneven brightness between the two ends of the light source of the linear fluorescent lamps.

In the case of the direct type, for example, the portion of the liquid crystal panel facing the high-voltage side of the linear fluorescent lamps is formed to have a small aperture ratio so as to reduce the amount of transmitted light passing through the panel, whereas the portion of the liquid crystal panel facing the low-voltage side of the linear fluorescent lamps is formed to have a large aperture ratio so as to increase the amount of transmitted light passing through the panel. This allows reduction of the uneven brightness in the longitudinal direction of the linear fluorescent lamps, thus ensuring an even brightness distribution. In the case of the edge light type, on the other hand, the aperture ratio of the liquid crystal panel is controlled correspondingly with the uneven brightness of the illumination light across the surface resulting from the uneven brightness in the longitudinal direction of the fluorescent lamp. This ensures an even brightness distribution.

Figure 17:
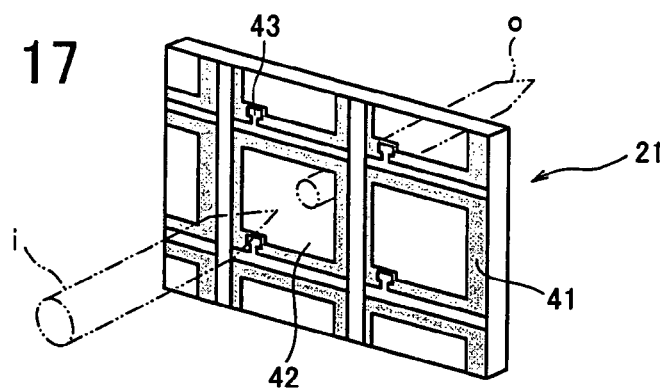
FIG. 17 is an explanatory view of the aperture ratio control in a liquid crystal panel.

FIG. 17 illustrates an example of a configuration adapted to control the aperture ratio. In the figure, reference numeral 21 denotes a liquid crystal panel, 41 a screening film, 42 clear electrodes, 43 TFT drive elements, i an incident light on the liquid crystal panel and o an outgoing light from the liquid crystal panel. In the liquid crystal panel 21, the screening film 41 is generally provided that is made of a grid-patterned metal film. In an example of the present embodiment, the aperture ratio of each of the pixels is controlled by the screening film 41 correspondingly with the uneven brightness of the fluorescent lamps during the formation of this film 41. This compensates for the uneven brightness in the longitudinal direction of the fluorescent lamps with the pixel-by-pixel optical transmittance, thus achieving a display screen with an even brightness.

As is apparent from the above description, the present invention imparts to the backlight unit the brightness compensation means adapted to compensate for the uneven brightness of the fluorescent lamps so as to compensate for the uneven brightness in the longitudinal direction inherently present in the linear fluorescent lamps and achieve a display screen with an even brightness. This compensates for the difference in brightness between the high- and low-voltage sides of the fluorescent lamps provided as the light source, thus achieving a backlight unit whose outgoing light delivers an even brightness. On the other hand, this backlight unit can be used to obtain a liquid crystal display device that delivers an even brightness over the entire display screen. Further, a liquid crystal display device can be obtained that delivers an even brightness over the entire display screen when the image data supplied to the liquid crystal panel or the aperture ratio of this panel is controlled to compensate for the brightness in the longitudinal direction of the fluorescent lamps.

The invention claimed is:

1. A backlight unit comprising:
   a plurality of straight tube fluorescent lamps arranged substantially parallel to one another in the longitudinal direction of the fluorescent lamps;
   driving means arranged on one-end side of the plurality of fluorescent lamps for driving the plurality of fluorescent lamps by applying a high voltage to one-end terminals of the plurality of fluorescent lamps; and
   a reflection portion adapted to emit the light from the plurality of fluorescent lamps in a specific direction, wherein
   brightness compensation means are provided for compensating for uneven brightness in the longitudinal direction of the plurality of fluorescent lamps by decreasing the brightness of the fluorescent lamps on one end side or increasing the brightness of the fluorescent lamps on the other end side or controlling brightness in combination from the both end sides,
   the reflection portion is made up of first and second reflection layers having given optical reflectance and transmittance levels,
   as the brightness compensation means, the reflection portion is configured with a first region having the first and second reflection layers stacked one above another in the direction of incidence of light and a second region made up only of the first reflection layer, and
   the reflectance of the reflection portion is controlled using the first region with a relatively high reflectance and the second region with a reflectance lower than that of the first region.

* * * * *